(12) United States Patent  
Black et al.

(10) Patent No.: US 11,178,356 B2  
(45) Date of Patent: Nov. 16, 2021

(54) MEDIA MESSAGE CREATION WITH AUTOMATIC TITLING

(71) Applicant: Apple Inc., Cupertino, CA (US)

(72) Inventors: David Black, San Jose, CA (US); Andrew L. Harding, Portola Valley, CA (US); Joseph-Alexander P. Weil, Greenbrae, CA (US); James Brasure, Belmont, CA (US); Joash S. Berkeley, Savannah, GA (US); Katherine K. Ernst, Cedar Rapids, IA (US); Richard Salvador, Culver City, CA (US); Stephen Sheeler, Santa Monica, CA (US); William D. Cummings, San Mateo, CA (US); Xiaohuan Corina Wang, Los Altos, CA (US); Robert L. Clark, Cupertino, CA (US); Kevin M. O'Neil, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/727,754

(22) Filed: Dec. 26, 2019

(65) Prior Publication Data

US 2020/0137349 A1 Apr. 30, 2020

Related U.S. Application Data

(63) Continuation of application No. 15/921,866, filed on Mar. 15, 2018, now Pat. No. 10,560,656.  
(Continued)

(51) Int. Cl.  
*H04N 5/92* (2006.01)  
*H04N 9/80* (2006.01)  
(Continued)

(52) U.S. Cl.  
CPC ............ *H04N 5/9207* (2013.01); *H04N 5/76* (2013.01); *H04N 5/9202* (2013.01);  
(Continued)

(58) Field of Classification Search  
USPC ................ 386/245, 246, 244, 239, 282, 278  
See application file for complete search history.

(56) References Cited

U.S. PATENT DOCUMENTS 8,645,134 B1 * 2/2014 Harrenstien ............ G10L 15/26  
                                                                             704/235  
2002/0010916 A1 * 1/2002 Thong .................... H04N 5/278  
                                                                               725/1  
(Continued)

FOREIGN PATENT DOCUMENTS

EP            1901284 A2    3/2008  
EP            2288105 A1    2/2011  
(Continued)

*Primary Examiner* — Daquan Zhao  
(74) *Attorney, Agent, or Firm* — Invoke

(57) ABSTRACT

In some implementations, a user device can be configured to create media messages with automatic titling. For example, a user can create a media messaging project that includes multiple video clips. The video clips can be generated based on video data and/or audio data captured by the user device and/or based on pre-recorded video data and/or audio data obtained from various storage locations. When the user device captures the audio data for a clip, the user device can obtain a speech-to-text transcription of the audio data in near real time and present the transcription data (e.g., text) overlaid on the video data while the video data is being captured or presented by the user device.

20 Claims, 25 Drawing Sheets

Related U.S. Application Data

(60) Provisional application No. 62/473,460, filed on Mar. 19, 2017.

(51) Int. Cl.

| | | |
|---|---|---|
| *H04N 5/76* | (2006.01) | |
| *H04N 21/433* | (2011.01) | |
| *H04N 21/485* | (2011.01) | |
| *H04N 21/422* | (2011.01) | |
| *H04N 21/439* | (2011.01) | |
| *H04N 21/4223* | (2011.01) | |
| *H04N 21/472* | (2011.01) | |
| *H04N 9/82* | (2006.01) | |
| *H04N 21/43* | (2011.01) | |
| *H04N 21/4402* | (2011.01) | |
| *G11B 27/00* | (2006.01) | |

(52) U.S. Cl.
CPC ......... *H04N 9/8211* (2013.01); *H04N 9/8233* (2013.01); *H04N 21/4223* (2013.01); *H04N 21/42203* (2013.01); *H04N 21/4307* (2013.01); *H04N 21/4334* (2013.01); *H04N 21/4394* (2013.01); *H04N 21/4398* (2013.01); *H04N 21/440236* (2013.01); *H04N 21/472* (2013.01); *H04N 21/4858* (2013.01)

(56) References Cited

U.S. PATENT DOCUMENTS

| | | |
|---|---|---|
| 2011/0111808 A1 | 5/2011 | Fields et al. |
| 2013/0080177 A1* | 3/2013 | Chen ................ G10L 15/26 |
| | | 704/275 |
| 2014/0201637 A1 | 7/2014 | Na et al. |
| 2014/0343938 A1 | 11/2014 | Kim et al. |
| 2018/0233162 A1* | 8/2018 | Venkataramani ....... G06F 3/165 |

FOREIGN PATENT DOCUMENTS

| | | |
|---|---|---|
| EP | 2317760 A2 | 5/2011 |
| EP | 2755399 A1 | 7/2014 |
| EP | 2806618 A1 | 11/2014 |

* cited by examiner

MEDIA MESSAGE CREATION WITH AUTOMATIC TITLING

CROSS-REFERENCE TO RELATED APPLICATION(S)

Each of the following applications are hereby incorporated by reference: application Ser. No. 15/921,866, filed on Mar. 15, 2018; application No. 62/473,460, filed on Mar. 19, 2017. The Applicant hereby rescinds any disclaimer of claim scope in the parent application(s) or the prosecution history thereof and advises the USPTO that the claims in this application may be broader than any claim in the parent application(s).

TECHNICAL FIELD

The disclosure generally relates to creating multimedia presentations.

BACKGROUND

With the advent of social media and the advancements in electronic messaging and network capabilities, video messaging is becoming more and more commonplace. Since many users turn off or turn down the sound when viewing video, users may wish to add titles, captioning, or other text to their video messages that describe the context of the video message or provide an opinion or comment on the video presented in the video message. However, manually adding captions, titles, and/or text to a video message can be burdensome and time consuming.

SUMMARY

In some implementations, a user device can be configured to create media messages with automatic titling. For example, a user can create a media messaging project that includes multiple video clips. The video clips can be generated based on video data and/or audio data captured by the user device and/or based on pre-recorded video data and/or audio data obtained from various storage locations. When the user device captures the audio data for a clip, the user device can obtain a speech-to-text transcription of the audio data in near real time and present the transcription data (e.g., text) overlaid on the video data while the video data is being captured and/or presented by the user device. Thus, a user can quickly generate a media message without having to manually generate the desired text.

Particular implementations provide at least the following advantages: A user can quickly generate a media message (e.g., media compilation, media sequence, media project, etc.) that includes media from multiple sources. The user can quickly add commentary or other audio to a video clip. The user device can automatically convert (e.g., transcribe) the audio speech into text that is overlaid on the presented video clip. Moreover, the transcription text can be synchronized with the video and/or audio of the video clip so that the words of the transcribed text are presented at the same rate (e.g., cadence) at which they were originally spoken in the audio recording and/or video recording. Thus, the user is saved the time and effort of manually generating captions, titling, or other text for presentation with the video clip and/or media message.

Details of one or more implementations are set forth in the accompanying drawings and the description below. Other features, aspects, and potential advantages will be apparent from the description and drawings, and from the claims.

DESCRIPTION OF DRAWINGS

Like reference symbols in the various drawings indicate like elements.

DETAILED DESCRIPTION

Figure 1:
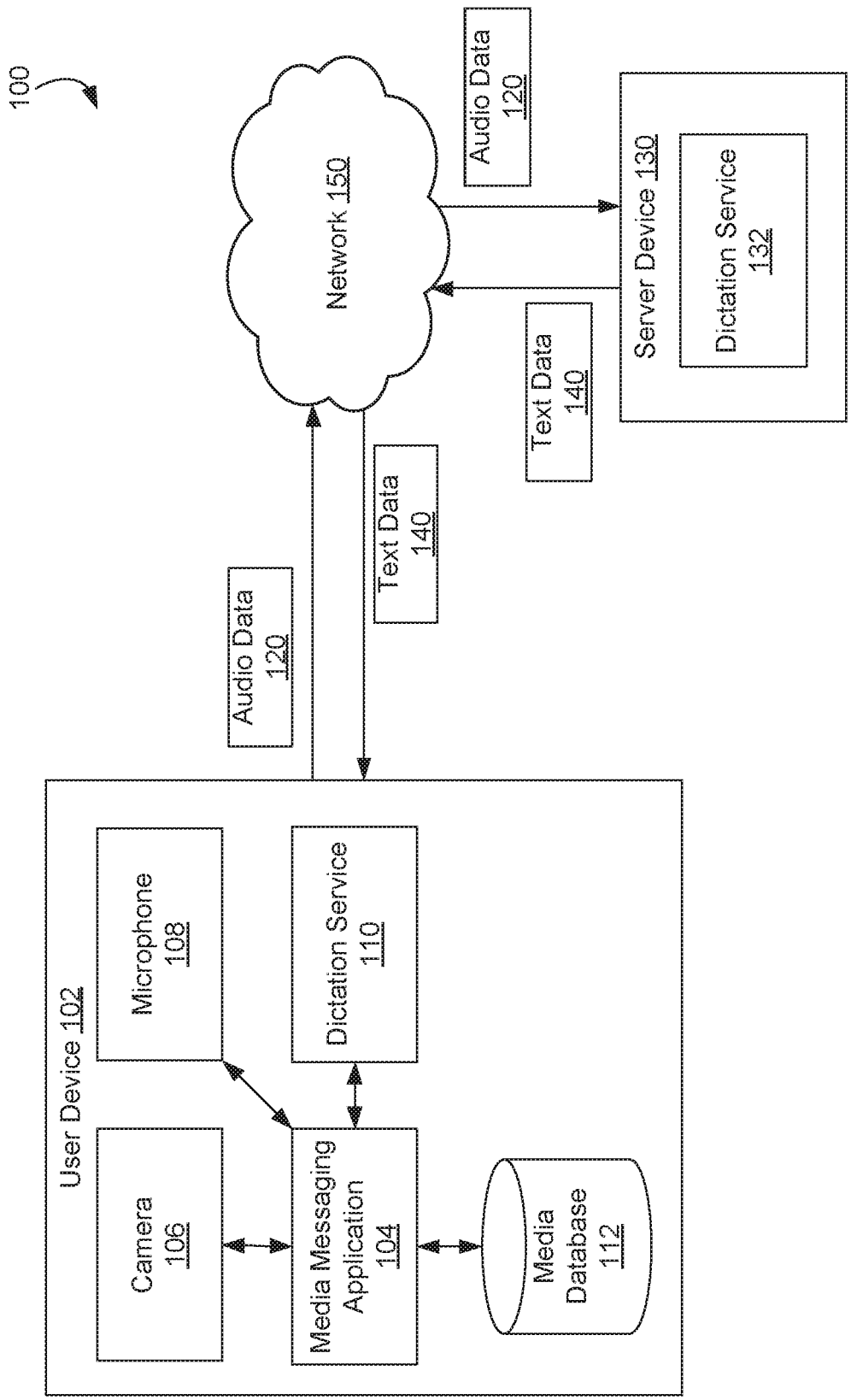
FIG. 1 is a block diagram of an example system for media message creation with automatic titling.

FIG. 1 is a block diagram of an example system 100 for media message creation with automatic titling. In some implementations, system 100 can include user device 102. For example, user device 102 can be a laptop computer, tablet computer, smartphone, smart watch, or other computing device.

In some implementations, user device 102 can include media messaging application 104. For example, media messaging application 104 can be a software application, software module, utility, operating system function, or other software installed on user device 102. A user can interact with media message application 104 to create or generate media messages (e.g., media compilations, media compositions, media sequences, media projects, etc.), as described herein. For example, the user can provide input to media message application 104 to create a new media messaging project that includes a sequence of one or more video clips (e.g., media segments). Each video clip can include captured or pre-recorded video data (e.g., still images, video frames, etc.), audio data, and/or transcription data that includes a text representation of speech from the audio data, among other things. The user can provide input to media messaging application 104 to cause media messaging application 104 to capture video data (e.g., still images, video frames, etc.) using camera 106. The user can provide input to media messaging application 104 to cause media messaging application 104 to capture audio data (e.g., speech) using microphone 108. After and/or while capturing the audio and/or video data, media messaging application 104 can send the audio data to dictation service 110 to obtain a textual representation (e.g., transcription data) of the captured audio data.

In some implementations, the user can provide input to media messaging application 104 to select a pre-recorded media item (e.g., audio data, video data, etc.). The pre-recorded media item can be obtained from the user's media database 112 on user device 102. The pre-recorded media item can be obtained from a remote resource, such as a network server, web page, or other Internet source. When the selected media item includes audio data, media messaging application 104 can send the pre-recorded audio data to dictation service 110 to obtain a textual representation of the pre-recorded audio data (e.g., when the audio data includes recorded speech).

In some implementations, user device 102 can include dictation service 110. For example, dictation service 110 can perform transcriptions of speech in audio data by sending audio data to a network dictation service (described below) and/or by performing transcriptions itself on user device 102. Thus, a network connection may or may not be required for dictation service 110 to transcribe audio data, as described herein.

In some implementations, dictation service 110 can be an application programming interface (API) that provides access to a network based dictation service. For example, dictation service 110 can provide an API for accessing dictation service 132 on server device 130 through network 150 (e.g., a local area network, wide area network, cellular data network, the Internet, etc.). For example, media message application 104 can provide the aforementioned audio data to dictation service 110. Dictation service 110 can send the audio data (e.g., audio data 120) to dictation service 132. Dictation service 132 can translate or transcribe the audio data (e.g. speech data) into text and then send the text data (e.g., text data 140) to dictation service 110 on user device 102. Dictation service 110 can then provide the text data to media message application 104 for presentation with a media message and/or video clip.

In some implementations, dictation service 110 can perform audio speech to text translations. For example, dictation service 110 can receive the audio data from media messaging application 104, transcribe or translate the speech data within the audio data into text and provide the resultant text to media messaging application 104 for presentation with a media message and/or video clip, as described further below.

In some implementations, media message application 104 can provide audio data to dictation service 110 in near real time. For example, as media messaging application 104 is receiving an audio stream from microphone 108, media messaging application 104 can send portions of the audio stream to dictation service 110 for translating into text. Media messaging application 104 can send the captured audio data to dictation service 110 every second for example. The first portion sent to dictation service 110 can be the first second of audio data, the second portion sent to dictation service 110 can be the first two seconds of audio data, and so on. For example, the portion of audio data can include the entire amount of audio received up until the current time. This allows media messaging application 104 to receive and present text translations for the first portions of the audio data in near real time while also allowing dictation service to use the context provided by the speech audio data added in subsequent portions of the audio data to correct the speech to text translations. Thus, a text translation initially presented by media messaging application 104 may be adjusted or changed after additional speech data is received and processed.

After the media message, including video data, audio data, and/or transcription data (e.g., text) is generated, the media message can be shared with other users and/or other devices. For example, when the user is finished generating the media message, the user can use user device 102 to send the media message to other user devices, servers, and/or services (e.g., social media services) for presentation or sharing with other users.

Figure 2:
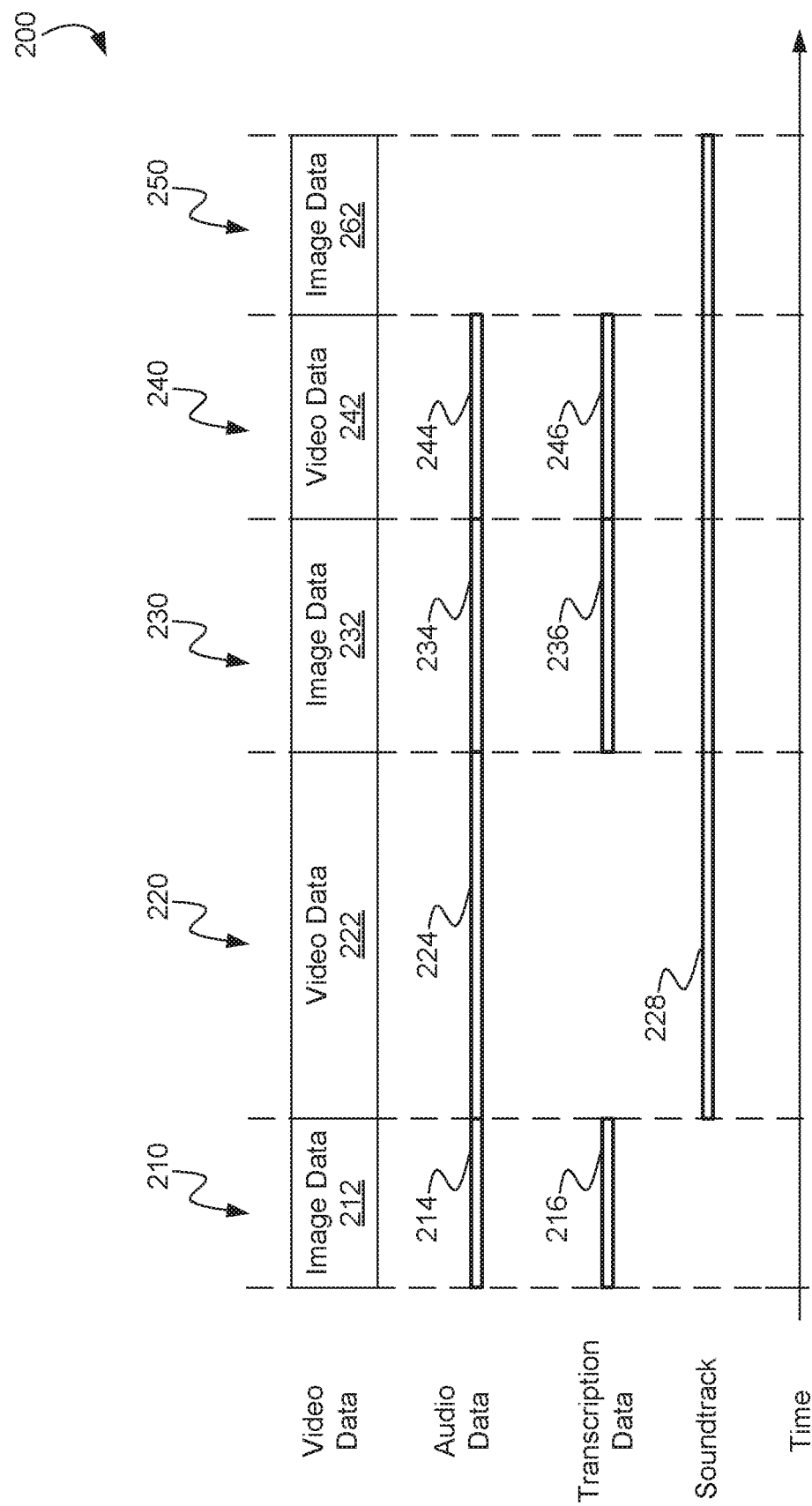
FIG. 2 is a conceptual illustration of a media message generated by media messaging application 104.

FIG. 2 is a conceptual illustration of a media message 200 generated by media messaging application 104. As described above, media message 200 (e.g., media project, media sequence) can include a sequence of video clips. For example, media message 200 can include clips 210, 220, 230, 240, 250 and/or 260. Each video clip can include video data (e.g., still image, sequence of video frames, etc.), audio data (e.g., recorded speech), and/or transcription data (e.g., a speech to text transcription or translation of the audio data). For example, clip 210 (e.g., delineated from other clips by vertical dashed line) can include still image data 212, audio data 214, and transcription data 216. When the video data for a clip is a still image, the duration of the clip can be determined based on the audio data associated with the clip. For example, if clip 210 includes a still image 212 and audio data 214 is ten seconds long, the duration of clip 210 will be ten seconds. When clip 212 is presented by user device 102 and/or media messaging application 104, the still image data 212 will be presented for 10 seconds while the audio data and/or corresponding transcription data is presented by user device 102.

As another example, clip 220 can include video data 222 (e.g., a sequence of video frames), and audio data 224. In clip 220, the user/creator of clip 220 decided to turn off transcription of audio data 220, as described below. Thus, no transcription data exists for clip 220. When played by user device 120, clip 220 will present video data 220 (e.g., a movie, a sequence of video frames, etc.) and audio data 224. The duration of clip 220 will correspond to the duration of video data 222.

In some implementations, media message 200 can include soundtrack 228. For example, the user can select an audio track, music, etc., as background for media message 200. While creating or editing clip 220, the user can select an audio track from the user's media library (e.g., media database 112) or from a network resource to add to media message 220 as the soundtrack for media message 220. The user can select a start time for soundtrack 228 (e.g., the beginning of clip 220) and soundtrack 228 can run for the remaining duration (e.g., until the end) of media message 200. For example, soundtrack 228 can continue playing while clips 210, 220, 230, 240 and/or 250 are presented by user device 102. When soundtrack 228 overlaps (e.g., is played at the same time) with audio data (e.g., audio data 214, 224, 234, 244) from clips 210, 220, 230, 240, the volume of soundtrack 228 can be reduced so that soundtrack 228 does not obscure the speech data included in the corresponding audio data when media message 200 is played back by user device 102.

As another example, clip 230 can include image data 232 (e.g., a still image). For example, image data 232 may be an image captured by camera 106 on user device 102 as the user is using media messaging application 104 to generate media message 200. Alternatively, image data 242 may correspond to a pre-recorded image stored in media database 112 that the user has selected to include in media message 200. Clip 230 can include audio data 234 that was recorded using media messaging application 104 and microphone 108, for example. Audio data 234 can correspond to speech recorded by user device 102 and/or media messaging application 104 while generating clip 230. Clip 240 can include transcription data 236. For example, media messaging application 104 can obtain transcription data 236 in real time or near real time while recording audio data 234 (e.g., the user's recorded speech), as described above.

Another example clip 240 can include video data 242 and audio data 244. For example, the user may interact with media messaging application 104 to select a pre-recorded media item (e.g., movie, video, or other image sequence) to add to clip 240. The selected media item can include pre-recorded audio data. For example, the media item may be a movie or video sequence previously recorded by the user that includes audio data corresponding to speech generated by the user. When the user selects the media item to add to clip 240, media messaging application 104 can send the audio data 244 corresponding to the selected media item to dictation service 110 for transcription into textual data. The textual data can be stored as transcription data 246 in clip 240 and presented to the user when clip 240 is presented on user device 102.

In some implementations, a clip may not have any audio data and/or transcription data. For example, clip 250 may include image data 262 (e.g., a still image) but may not include audio data. Since clip 250 does not have any audio data, media messaging application 104 will have no speech data to transcribe into text. Thus, clip 250 does not include transcription data. However, if the user wishes to add audio data (e.g., speech data) and generate transcription data (e.g., textual data, titling data, captioning data, etc.), the user may interact with various graphical user interfaces (GUIs) of media messaging application 104 to generate audio data and transcription data for clip 250, as described in detail below.

After adding clips 210, 220, 230, 240 and/or 250 to media message 200, the user may provide input to media messaging application 104 to cause media messaging application 104 to present media message 200 on user device 102. For example, FIG. 2 shows clips 210, 220, 230, 240 and/or 250 in a particular order or sequence from left to right. As each clip is generated, the new clip can be added to at the end of the current sequence of clips in media message 200. If the user wants the clips to be presented in a different order, the user may provide input (described below) to rearrange the order of the clips in media message 200. At any time while the user is creating or editing media message 200 (or any of the clips in media message 200), the user may cause media message application 104 to playback or present media message 200. Media message application 104 will then present the clips in media message 200 according to the user specified order and according to the timing information defined in each clip.

Figure 3:
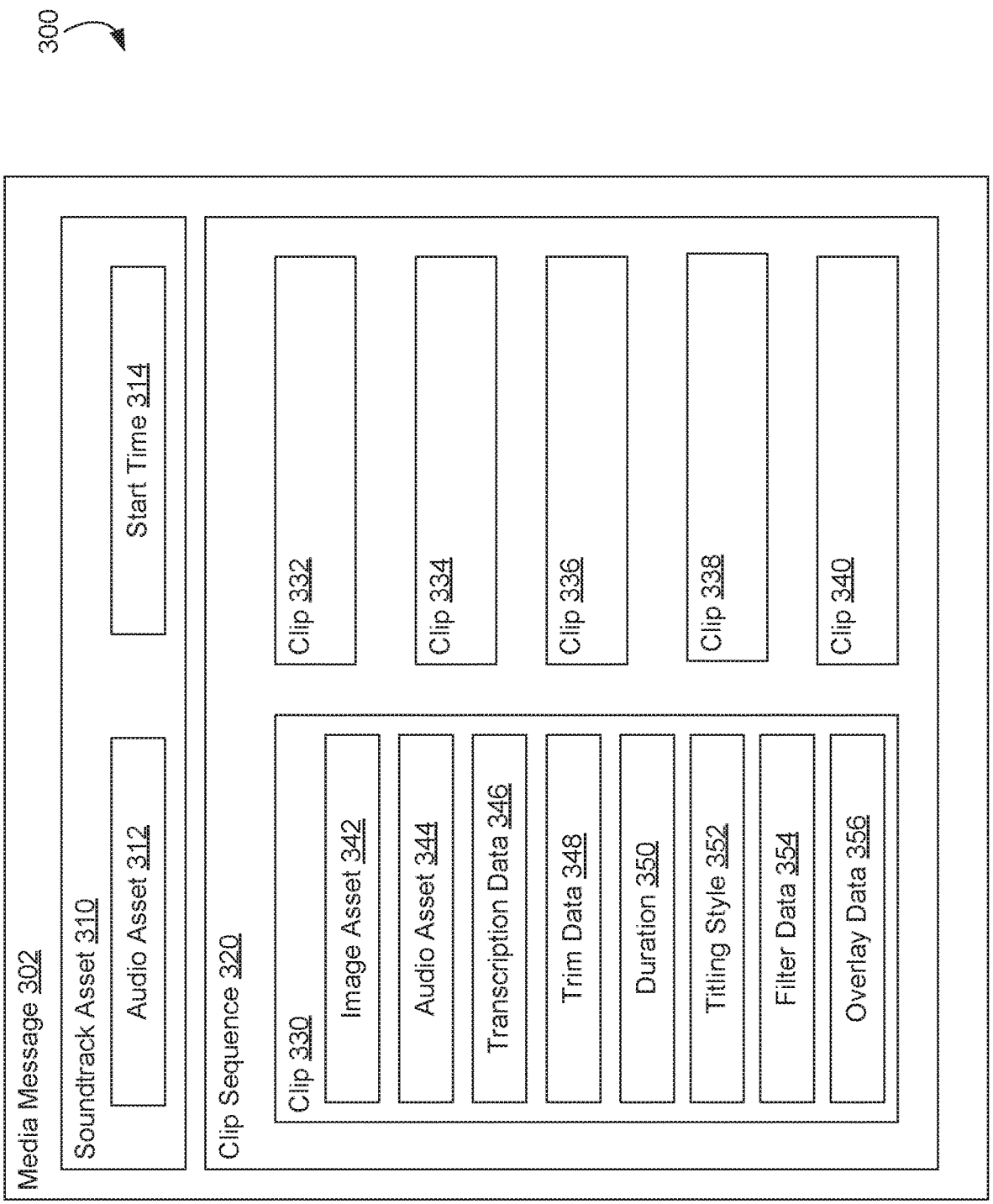
FIG. 3 is a block diagram representing an example data structure for managing a media message project.

FIG. 3 is a block diagram representing an example data structure 300 for managing a media message project. For example, data structure 300 can be used to store and organize data for media message 200 generated by media messaging application 104, as described herein. In some implementations, data structure 300 can include media message object 302. Media message object 302 can be the container for data (e.g., soundtrack data, video data, audio data, transcription data, etc.) defining a media message generated by the user using media messaging application 104.

In some implementations, media message object 302 can include soundtrack asset object 310. For example, soundtrack asset object 310 can include an audio asset attribute 312. The audio asset attribute 312 can include an identifier for an audio asset (e.g., music track) that the user has selected to be the soundtrack for media message 302. The identifier for the audio asset can be a uniform resource locator (URL) for the audio asset or some other identifier that media messaging application 104 can use to identify and obtain the audio asset selected by the user. The soundtrack asset object 310 can include a start time attribute 314. For example, the start time attribute 314 can store a timestamp representing a time at which playback of the identified soundtrack audio asset should be initiated. The value for the start time attribute 314 can be relative to the beginning of media message 302. For example, the start time attribute 314 can have a value that indicates that the soundtrack audio asset should start 10 seconds, 15 seconds, 30 seconds, etc., after beginning the playback of the media message 302.

In some implementations, media message object 302 can include clip sequence object 320. Clip sequence 320 can include one or more clips that the user has added to the media message. The clips in clip sequence 320 can be ordered. The order of the clips in clip sequence 320 can define the order in which the clips in clip sequence 320 are presented when media message 302 is presented by media messaging application 104 and/or user device 102. For example, clip sequence 330 can include an ordered collection of clips 330, 332, 334, 336, 338 and/or 340. Each clip in clip sequence 330 can include the same attributes (described below) but the values of the attributes of each clip may be different. Thus, each clip may present a different media segment having different video data, different audio data, and/or different presentation styles.

In some implementations, each clip in clip sequence 320 may have a variety of attributes that define the video data, audio data, and presentation styles for each clip. For example, the user can generate a new clip 330 or edit an old clip 330. As clip 330 is generated or edited by the user, media messaging application 104 can store values for the various clip attributes in clip 330. When clip 330 is played back or presented by user device 102, clip 330 can be presented according to the values of the various attribute values stored in clip 330.

In some implementations, clip 330 can include an image asset attribute 342. Image asset attribute 342 can include an identifier (e.g., URL) for an image asset (e.g., video, still image, photograph, etc.) to be presented by clip 330 when clip 330 is presented on user device 102. For example, when a user records a new image (e.g., video, movie, still image, etc.) using media messaging application 104, media messaging application 104 can store an identifier for the newly recorded image in image asset attribute 342. When a user selects an image (e.g., video, movie, still image, etc.) to add to a clip or media message, media messaging application 104 can store the identifier for the selected image in image asset attribute 342.

In some implementations, clip 330 can include audio asset attribute 344. For example, audio asset attribute 344 can store an identifier for an audio asset associated with clip 330. When the user records new audio data (e.g., speech data) for clip 330, media messaging application 104 can store the identifier for the newly recorded audio data in audio asset attribute 344. When the user selects a media item for clip 330, media message application 104 can store the identifier for the media item in audio asset attribute 344.

In some implementations, clip 330 can include transcription data attribute 346. For example, transcription data attribute 346 can store the transcription data received from dictation service 110, as described above. For example, when a user records new audio data (e.g., identified in audio asset attribute 344) or when the user selects an audio asset (e.g., audio data) to add to clip 330, media messaging application 104 can send the audio data to dictation service 110. Dictation service 110 can translate the audio speech data into transcription data representing the words (e.g., tokens) spoken in the speech data and the cadence (e.g., timing, rate, etc.) at which the words were spoken. When dictation service 110 returns the transcription data to media messaging application 104, media messaging application 104 can store the transcription data in transcription data attribute 346. In some implementations, media messaging application 104 may only request a transcription of the audio data from dictation service 110 when a titling style has been selected for the clip and when audio data is available for the clip, as described further below. Thus, some clips may include transcription data while other clips may not include transcription data.

In some implementations, clip 330 can include trim data attribute 348. For example, a user may select to trim a long duration clip down to a shorter duration or down to a segment of the clip. While viewing the clip, the user can provide input to media messaging application 104 indicating a start time at which the trimmed portion of the clip should begin and/or an end time at which the trimmed portion of the clip should end. Media messaging application 104 can store the trim start time (e.g., an offset from the beginning of the clip) and/or the trim end time (e.g., an offset from the beginning of the clip) in trim data attribute 348. When media messaging application 104 later plays back clip 330, media messaging application 104 can start the playback of clip 330 (e.g., video data, audio data, and/or transcription data) at the trim start time and terminate playback of clip 330 at the trim end time.

In some implementations, clip 330 can include duration attribute 348. For example, media messaging application 104 can determine the playback duration for clip 330 and store a time value representing the playback duration in duration attribute 350. When clip 330 has not been trimmed (e.g., trim data attribute 348 is empty or null) and the image asset is a video or movie asset, the value for the duration attribute can correspond to the playback duration of the image asset for clip 330. When clip 330 has not been trimmed (e.g., trim data attribute 348 is empty or null) and the image asset is a still image, the value for the duration attribute can correspond to the playback duration of the audio asset for clip 330. When clip 330 has been trimmed (e.g., when trim data attribute 348 identifies a start time and/or end time), the value for the duration attribute can correspond to the difference between the trim start time and the trim end time for clip 330. Media messaging application 104 can calculate the sum of the durations of each clip in media message 302 to determine the duration of media message 302, for example.

In some implementations, clip 330 can include titling style attribute 352. For example, when creating clip 330 using media messaging application 104, the user can provide input to media messaging application 104 to select a titling style for clip 330. The titling style can, for example, define how text, captions, titling, transcription data, etc., is presented while clip 330 is being played on user device 102 (or any other computing device). A titling style can define various text attributes, such as fonts, font (e.g., text) sizes, text color, text display location, and/or how many lines of text are displayed at the same time. The titling style can define various animations for presenting text while a clip is being played. The animations can include fade in, fade out, translations, scaling effects, and/or other animations.

In some implementations, a titling style can be configured to automatically and/or dynamically adjust how text (e.g., transcription data) is presented when a clip is played by user device 102. For example, adjust the formatting, animation, and/or location of transcription text as the text is presented based on the cadence, volume, and/or emotion detected with respect to speech captured in audio data. For example, when recording audio, the user may speak a particular word louder than other words to emphasize the particular word. Media messaging application 104 can detect the change in volume with respect to how the particular word is spoken and adjust the formatting, animation, and/or location of the presented text to emphasize the text representing the particular word. For example, a particular titling style may have a default font size of 12 points for presenting text. However, when media messaging application 104 detects an increase in intensity (e.g., volume, cadence, pitch, emotion, etc.) with respect to how a particular word is spoken in captured audio data, the particular titling style may cause media messaging application to present the particular word in a size 20 font, bold formatting, underlined, red font, or with some animation that emphasizes the particular word. Conversely, when media messaging application 104 detects an decrease in intensity (e.g., volume, cadence, emotion, etc.) with respect to how a particular word is spoken in captured audio data, the particular titling style may cause media messaging application to present the particular word in a size 8 font, regular formatting, grey font, or with some animation that softens the presentation of particular word.

In some implementations, a particular word can cause media messaging application 104 to dynamically change how a word is presented. For example, particular words, such as expletives, can suggest an increase or decrease in emotion with respect to words or speech in captured audio. Media messaging application 104 can detect a word that indicates an increase or decrease in the emotions of the speaker and adjust the formatting, animation, and/or location of the presented text to emphasize the text representing the particular word. For example, a particular titling style may have a default font size of 12 points for presenting text. However, when media messaging application 104 detects a particular word associated with an increase in emotion in captured audio data, the particular titling style may cause media messaging application to present the particular word in a size 20 font, bold formatting, underlined, red font, or with some animation that emphasizes the particular word.

Many different types of titling styles (including no titling) that define different text attributes and/or animations can be predefined in media messaging application 104. Each titling style can have a corresponding identifier. When the user selects a titling style for clip 330, the identifier for the titling style can be stored in titling style attribute 352. When clip 330 is played or presented to the user, media messaging application 104 can apply the text attributes and/or animations defined by the selected style to the text in transcription data attribute 346 as the text is being presented over the image asset for clip 330. Thus, each clip in clip sequence 320 may present transcription data text according to a different titling style to achieve a different look and feel for each clip as it is presented when media message 302 is presented by media message application 104.

In some implementations, clip 330 can include filter data attribute 354. For example, when creating clip 330 using media messaging application 104, the user can select one of many predefined image filters to apply to the image data (e.g., video, movie, still image, etc.) identified by image asset attribute 342. Upon selection of a filter, media messaging application 104 can store an identifier corresponding to the selected filter in filter data attribute 354. Later, when clip 330 is played back or presented on user device 230, media messaging application 104 can apply the filter to the image data to create the filter effect selected by the user for clip 330.

In some implementations, clip 330 can include overlay data 356. For example, when creating clip 330 using media messaging application 104, the user can add various image overlays (e.g., graphics, emoticons, etc.) to be presented when the image data and/or transcription data is being presented by user device 102. The overlay data can, for example, include a collection of overlay assets (e.g., graphics, emoticons, text, etc.) and corresponding time offsets that identify when the corresponding overlay asset should be displayed. For example, the user can select a smiley face graphic and provide input indicating that the smiley face graphic should be presented 13 seconds from the beginning of clip 330. Media messaging application 104 can then store an association of the identifier for the smiley face graphic (e.g., overlay asset) and the time offset for the overlay asset. Later, when clip 330 is presented by media messaging application 104, media messaging application can determine which overlay assets to present and when to present the overlay assets based on the data stored in overlay data attribute 356.

While the above describes example clip attributes and attribute values (e.g., data) for an example clip 330, clips 332-340 may include similar attributes that may store similar or different attribute values as clip 330. For example, the user can define attribute values for clip 332 that are different than clip 330 to generate a clip 332 for media message 302 that presents different media content having a different look and feel. Clips 330 and clip 332 can be added the same media message 302 to generate different media segments for media message 302.

Figure 4:
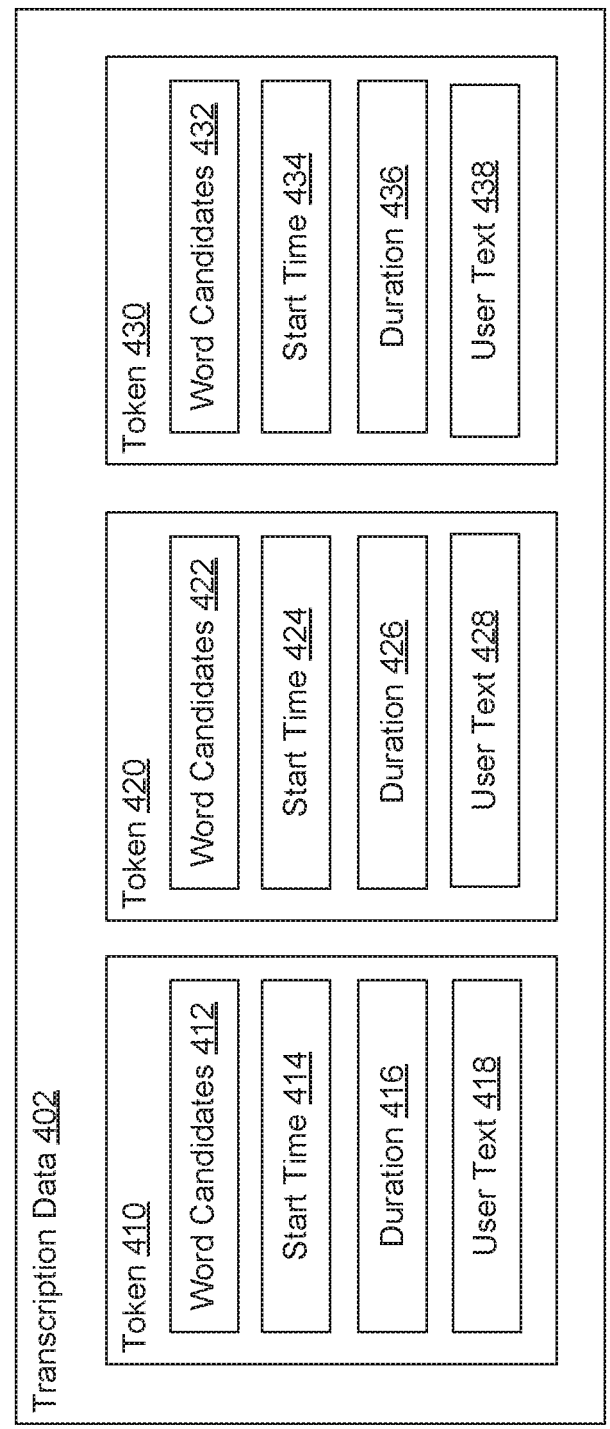
FIG. 4 is a block diagram representing an example data structure for managing transcription data for a clip.

FIG. 4 is a block diagram representing an example data structure 400 for managing transcription data for a clip. For example, data structure 400 can store transcription data 402. Transcription data 402 can correspond to transcription data 346 of FIG. 3.

In some implementations, transcription data 402 can include a series of tokens. For example, a token can represent a unit of transcription data that corresponds to a word, phrase, or other portion of recorded speech. As described above, when media messaging application 104 records audio data using microphone 108, media messaging application 104 can send the recorded audio data to dictation service 110 for translating speech in the audio data into text. As media messaging application is receiving the audio stream from microphone 108, media messaging application 104 can request the translation of the audio data in the audio stream in near real time as the user is speaking into the microphone. For example, after receiving the first second of streaming audio, media messaging application 104 can send the first second of audio data to dictation service 110. Dictation service 110 can translate the first second of audio data into tokens (e.g., tokens 410 and 420) that correspond to the first word and the second word, respectively, spoken in the first second of audio data.

In some implementations, each token 410, 420, 430 generated by dictation service 110 can include word candidates 412, 422 and/or 432, respectively. For example, word candidates 412 can include a collection of word-confidence score pairs. When dictation service 110 translates the speech from the audio data received from media messaging application 104 into text, dictation service 110 can determine the most likely words (candidate words) that match a detected word in the audio data. Dictation service 110 can store the candidate words in the token (e.g., token 410) along with the respective confidence scores (e.g., probabilities) for each candidate word. The pairings of candidate words and confidence scores for token 410 can be stored in word candidates 412. When media messaging application 104 presents token 410 during playback of a clip, media messaging application 104 can present the word in word candidates 412 that has the highest confidence score.

In some implementations, word confidence scores can change over time. For example, generating tokens from audio data can be an iterative process. Media messaging application 104 can send a first portion (e.g., audio data) of an audio stream to dictation service 110. Dictation service 110 can generate tokens (e.g., token 410, token 420) based on the audio data and contextual clues (e.g., other spoken words) in the audio data. Dictation service 110 can send the tokens back to media messaging application 104 with word candidates and confidence scores generated based on the first portion of the audio stream.

As the audio stream continues, media messaging service 104 can send the next portion (e.g., next minute, minute two) of audio data to dictation service 110. Dictation service can translate the second minute of audio data into text and reevaluate the tokens (e.g., tokens 410, 420) generated for the first minute of audio data based on the additional contextual clues (e.g., words, phrases, etc.) in the second minute of audio data. Upon evaluating the contextual clues in the second minute of audio data, dictation service 110 may regenerate the confidence scores for candidate words in tokens 410 and 420 which may cause a candidate word that was initially scored highest in word candidates 412 to now have a lower score. When the candidate word's confidence score is lowered, another candidate word may be rescored and have a higher confidence score. Thus, media messaging application 104 may initially present one word for token 410 and later present a different word for token 410 when the candidate words in token 410 are rescored. This iterative process of transcribing the speech in the audio data can continue until the message stream terminates or media messaging application 104 reaches the end of the audio data for a clip.

In some implementations, tokens 410, 420, and/or 430 can include start time 414, 424, and/or 434, respectively. For example, when media messaging application 104 sends audio data to dictation service 110, dictation service 110 can detect and/or identify words within the audio data. Dictation service 110 can also determine when the words occur (e.g., are spoken) in the audio data. For example, dictation service 110 can determine that a word corresponding to token 410 occurred one second from the beginning of the audio data. Dictation service 110 can then store a value representing one second in start time 414. Similarly, dictation service 110 can determine that a word corresponding to token 420 occurred two seconds from the beginning of the audio data for a clip. Dictation service 110 can then store a value representing two seconds in start time 424. Dictation service 110 can determine that a word corresponding to token 430 occurred eight seconds from the beginning of the audio data for a clip. Dictation service 110 can then store a value representing eight seconds in start time 434.

When presenting the transcription data (e.g., text, titling data, captioning, etc.), media messaging application 104 can present the words (e.g., text) in the corresponding tokens according to the start times recorded in each token. For example, media messaging application 104 can present the highest scored candidate word in token 410 one second after playback of the corresponding clip begins. Media messaging application 104 can present the highest scored candidate word in token 420 two seconds after playback of the corresponding clip begins. Media messaging application 104 can present the highest scored candidate word in token 430 eight seconds after playback of the corresponding clip begins. Thus, media messaging application 104 can present textual representations of the words in the transcription data at about the same cadence (e.g., rate, timing, etc.) as the words were spoken in the audio data for the corresponding clip so that the tokens in the transcription data can be presented in synch with the corresponding words or phrases captured in the audio and/or video data.

In some implementations, tokens 410, 420, and/or 430 can include duration attribute 416, 426, and/or 436, respectively. For example, when media messaging application 104 sends audio data to dictation service 110, dictation service 110 can detect and/or identify words within the audio data. Dictation service 110 can also determine how long it takes for the words to be spoken in the audio data. For example, a short word like "yes" may take a fraction of a second to speak while a long word like "Mississippi" may take a whole second to speak. Dictation service 110 can determine how long it takes to speak a word in the audio data and store a value representing the amount of time it takes to speak the word in the duration attribute (e.g., duration attribute 416, 426, 436) of the corresponding token. When media messaging application 104 presents a clip having transcription data, media messaging application 104 can present the tokens/words in the transcription data according to the cadence specified by the respective token start times. Media messaging application 104 can present the tokens/words for the duration value specified in the respective duration attributes for each token. Thus, media messaging application 104 can present the textual transcription data in a manner that mimics the speech data in the clip's audio data.

In some implementations, tokens 410, 420, and/or 430 can include user text attribute 418, 428, and/or 438, respectively. For example, after dictation service 110 generates a token (e.g., token 412, 420, and/or 430), the user may edit the token to correct a transcription or to add additional description (e.g., text, words, phrases, etc.) to transcription data 402. When the user edits a token, media messaging application 104 can store the text corresponding to the user's edits in user text attribute 418, 428, or 438 for the edited token. When media messaging application 104 later presents the edited token, media messaging application 104 can determine if the user text attribute of the edited token is storing any text. If the user text attribute of a token is storing text, then media messaging application 104 can present the text in the user text attribute instead of the highest scored word in the word candidates attribute of the corresponding token. The user provided text can be presented according to the start time and/or duration specified in the corresponding token so that the cadence and/or duration of token presentation remain unchanged.

User Interfaces

Figure 5:
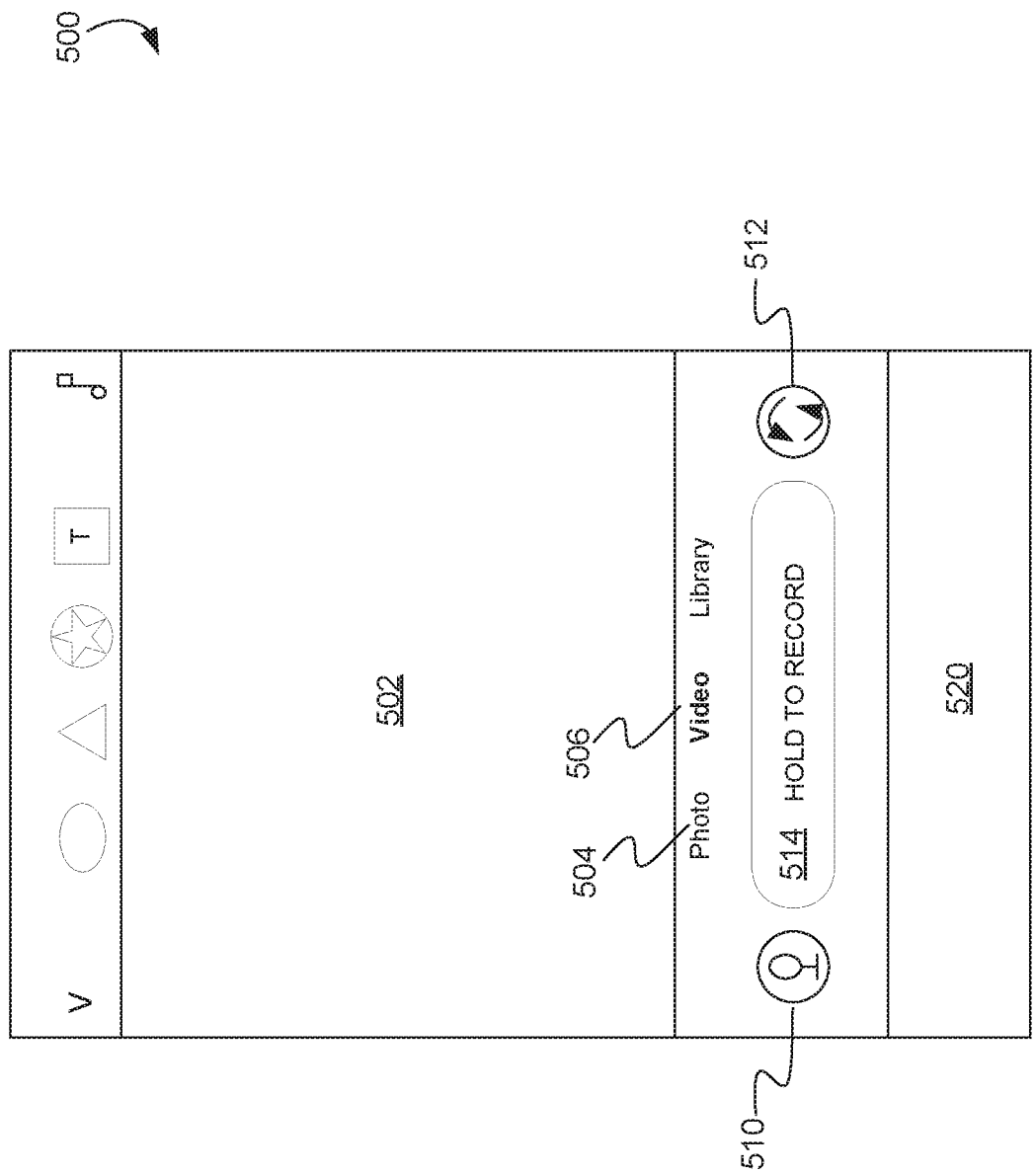
FIG. 5 illustrates an example graphical user interface for generating a media message based on captured image data.

FIG. 5 illustrates an example graphical user interface 500 for generating a media message based on captured image data. For example, GUI 500 can be presented by media messaging application 104 on a display of user device 102 when the user invokes media messaging application 104 on user device 102. GUI 500 can be presented to allow the user to create a new media message. GUI 500 can be presented to allow the user to edit or add a clip to an existing media message.

In some implementations. GUI 500 can include image presentation area 502. For example, initially, area 502 can present a live camera feed (e.g., streaming video data) from one of the cameras (e.g., camera 106) on user device 102. When the user invokes media messaging application 104, media messaging application 104 can turn on camera 106, obtain the video data stream from camera 106, and present the video data stream (e.g., images) in presentation area 502.

In some implementations, GUI 500 can present options 504, 506, and/or 508 for obtaining image data for a clip. For example, a user can select photo option 504 to capture a still image for a new clip to be added to the current media message. When the user selects option 504, the user can select and hold graphical element 514 (e.g., a button) to capture a still image with camera 106 and capture an audio stream with microphone 108. For example, when the user initially selects graphical element 514, media messaging application 104 can capture a still image with camera 106. As the user continues to provide input to (e.g., touch, hold down, etc.) graphical element 514, media messaging application 104 can continue to present the captured image in area 502 and record audio data using microphone 108. When the user releases or stops providing input to graphical element 514, media messaging application 104 can stop recording the audio data and store the video data (e.g., still image) and/or audio data in a new clip, as described above. The clip can then be stored as part of the media message.

In some implementations, the user can select video option 506 to capture a video or movie for a new clip to be added to the current media message. When the user selects option 506, the user can select and hold graphical element 514 (e.g., a button) to capture a video stream with camera 106 and capture an audio stream with microphone 108. For example, when the user initially selects graphical element 514, media messaging application 104 can begin recording a video stream from camera 106 and/or an audio stream from microphone 108. As the user continues to provide input to (e.g., touch, hold down, etc.) graphical element 514, media messaging application 104 can continue to record the video data and/or audio data. When the user releases or stops providing input to graphical element 514, media messaging application 104 can stop recording the video data and/or audio data and store the video data and/or audio data in a new clip, as described above. The clip can then be stored as part of the media message.

In some implementations, GUI 500 can include graphical element 510 for enabling and/or disabling voiceovers for a clip. For example, when GUI 500 is presented, media messaging application 104 can turn on microphone 108 to detect and/or record audio data. However, a user may not wish to store and/or playback audio data for a particular clip. The user can select graphical element 510 to enable or disable storage and/or playback of audio data (e.g., voiceovers) for a particular clip. For example, the user can select graphical element 510 to enable and/or disable voiceovers for a new clip. When voiceovers are enabled, media messaging application 104 can record and persistently store the audio data received from microphone 108 in the new clip, as described above. For example, persistently storing the audio data can include storing the audio data beyond the current recording session so that the audio data is available when the clip is later played back or presented on user device 102. When voiceovers are disabled, media messaging application 104 can obtain audio data from microphone 108 but not persistently store the audio data received from microphone 108 in the new clip, as described above. For example, media messaging application 104 can delete the captured audio data after the recording session has terminated and/or after the final transcription of the audio data is performed. Thus, the audio data may not be available when the clip is subsequently played back by user device 102. By obtaining the audio data, media messaging application 104 can still provide the audio data to dictation service 110 to obtain transcription data. However, by not persistently storing the audio data in the new clip, media messaging application 104 will not playback the audio data as a voiceover track when later playing back the new clip.

In some implementations, GUI 500 can include graphical element 512 for switching the video or image source between front facing and rear facing cameras on user device 102. For example, user device 102 may be a mobile device having front facing (e.g., toward the main display screen) and rear facing cameras. The user may select graphical element 512 to toggle between front facing and rear facing cameras as the source of the video data to be captured by media messaging application through GUI 500.

In some implementations, GUI 500 can include clip browser area 520. For example, while recording a clip, area 520 can present the captured still image or frames of the captured video stream. When not recording a clip, area 520 can present representations of clips that have been previously recorded and added to the current media message project.

Figure 6:
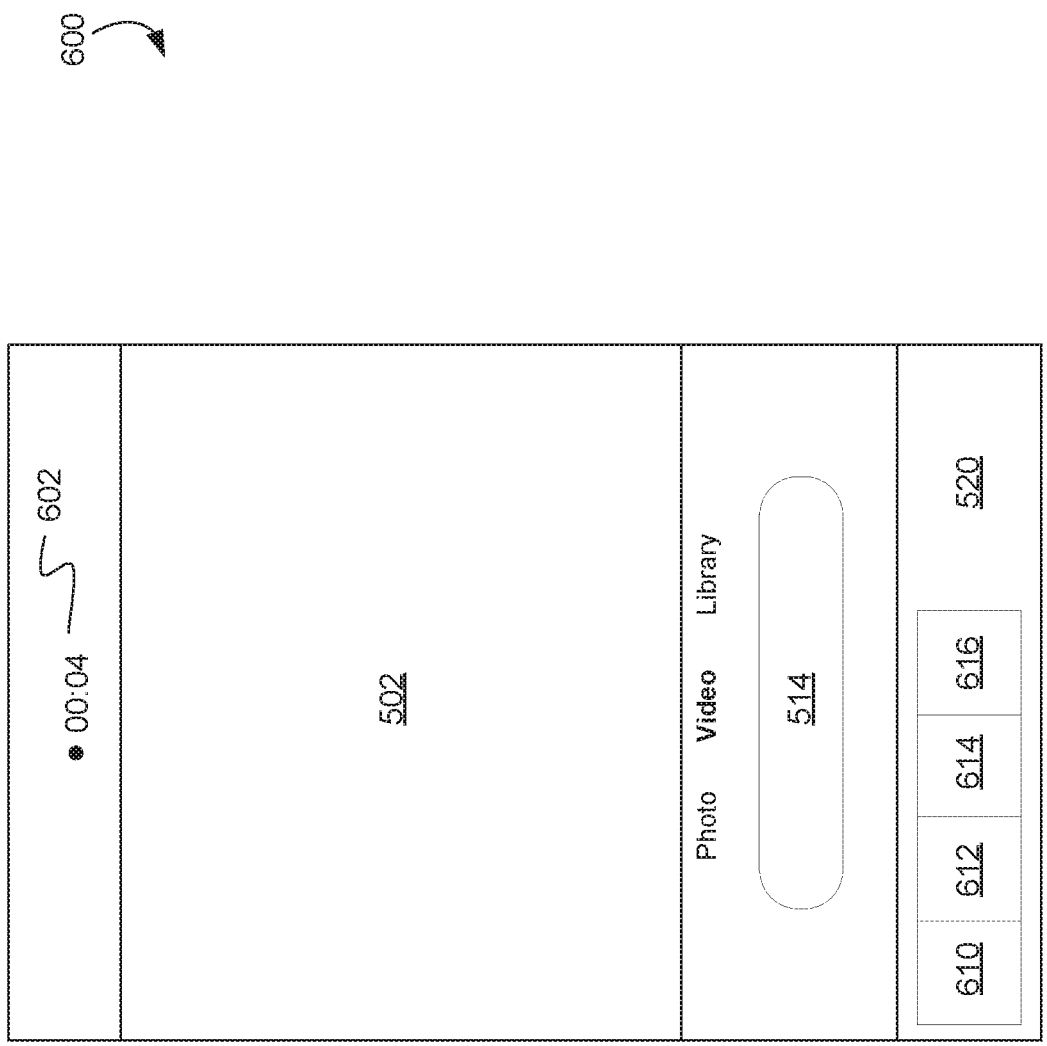
FIG. 6 illustrates an example graphical user interface for presenting clip recording state information.

FIG. 6 illustrates an example graphical user interface 600 for presenting clip recording state information. For example, GUI 600 can be presented in response to the user selecting graphical element 514. Media messaging application 104 can continue to present GUI 600 while the user continues to provide input to (e.g., select and hold) graphical element 514.

In some implementations, GUI 600 can include graphical element 602 for presenting recording time information. For example, graphical element 602 can indicate the amount of time that has elapsed since media messaging application 104 began recording audio and/or video data.

In some implementations, GUI 600 can include graphical elements 610-616 representing image data captured for the currently recording clip. For example, if the user has selected to capture a photo as the video data (e.g., image data, image asset) for the currently recording clip, then area 520 can present a single graphical element (e.g., graphical element 610) representing the captured still image. If the user has selected to capture a movie as the video data (e.g., image data, image asset) for the currently recording clip, then area 520 can present a multiple graphical elements (e.g., graphical elements 610-616) representing frames of the captured movie. For example, as the user continues to record the movie, additional frames of the movie can be presented in area 520.

Figure 7:
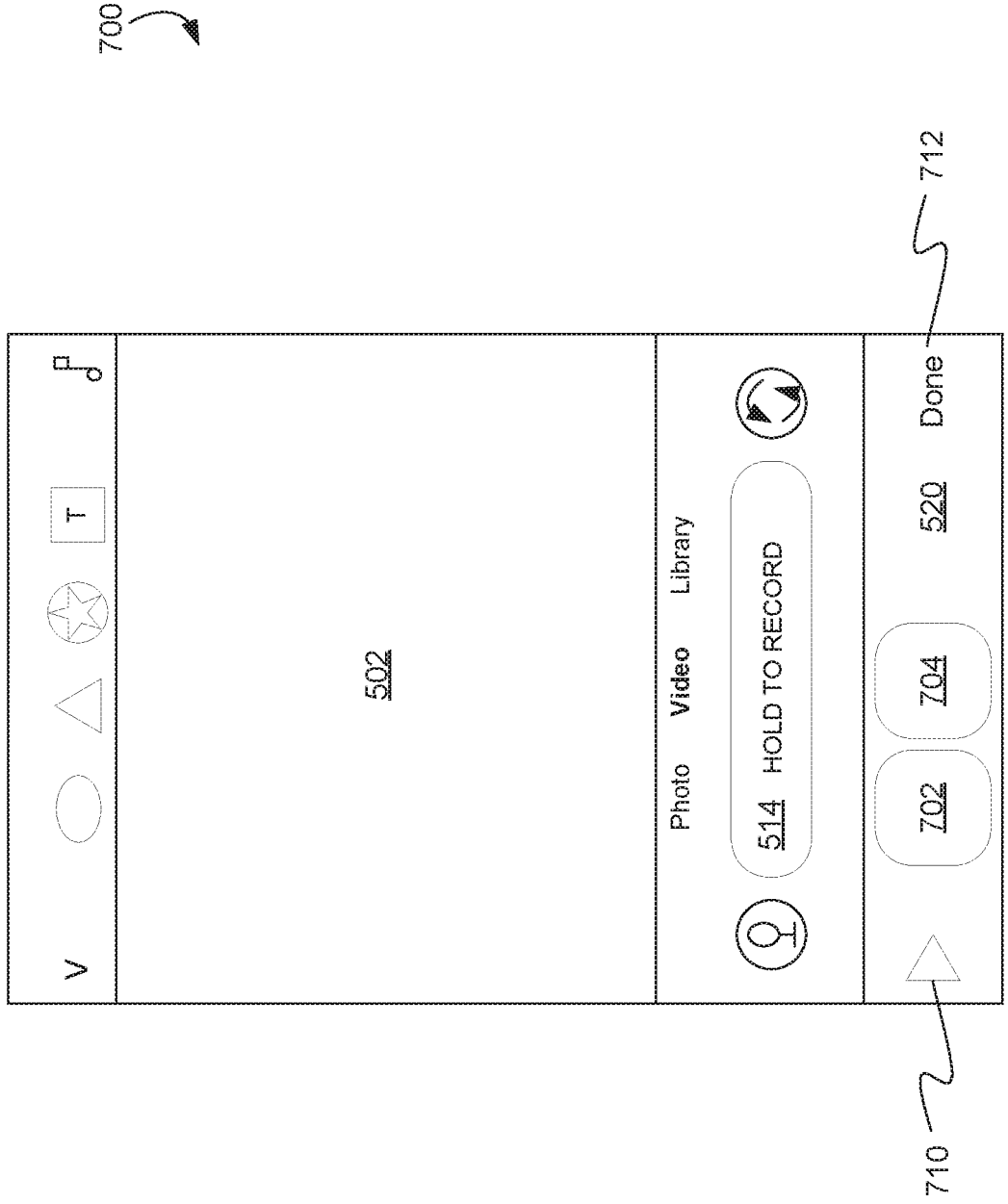
FIG. 7 illustrates an example graphical user interface for viewing a sequence of clips in a media message.

FIG. 7 illustrates an example graphical user interface 700 for viewing a sequence of clips in a media message. For example, GUI 700 can correspond to GUI 500 described above. However, GUI 700 represents a state of media messaging application 104 where the currently selected media message already includes a couple of clips represented by graphical elements 702 and 704. For example, graphical elements 702 and 704 can present the first frame of the video data for each respective clip. As described above with reference to FIG. 5 and FIG. 6, the user can add a new clip to the currently selected media message by selecting and holding graphical element 514. The user can provide input to graphical element 514 repeatedly to add new clips to the media message. The new clips can be presented (e.g., in the sequence in which they were recorded, in a user-specified sequence) in area 520.

In some implementations, a user can interact with GUI 700 to rearrange the order of clips in a media message. For example, the user can select, drag, and drop representations (e.g., 702, 704) of clips in area 520 to change the order of the clips in the current media message. For example, while clip 702 may be initially ordered before clip 704, the user can select clip 702 and drag clip 702 to a position in area 502 to the right of clip 704 to change the presentation order of the clips such that clip 704 is presented before clip 702 when the media message is played.

In some implementations, GUI 700 can include graphical element 710 for playing a media message. For example, the user can select graphical element 710 to cause media messaging application 104 to playback the sequence of clips associated with the current media message. When the user selects graphical element 710, for example, media messaging application can present the video and/or transcription data (when available) associated with each clip in the media message in area 502. If the currently playing clip includes audio voiceover data, then media message application 104 can present the audio data using a speaker of user device 102.

When the user is done editing (e.g., adding clips, rearranging clips, viewing clips) the current media message, the user can select graphical element 712 to save the current media message. For example, media messaging application 104 can persistently store the video, audio, and/or transcription data for the media message in the data structures described above. In some implementations, when the user selects graphical element 712, media messaging application 104 can format the media message data for distribution to other devices. For example, when the user selects graphical element 712, media messaging application 104 can convert the media message data into a common video format (e.g., mp4, movie, etc.) for distribution to other devices. Thus, the user can share the media message using instant messaging, email, social media, and/or other common communication mechanisms.

Figure 8:
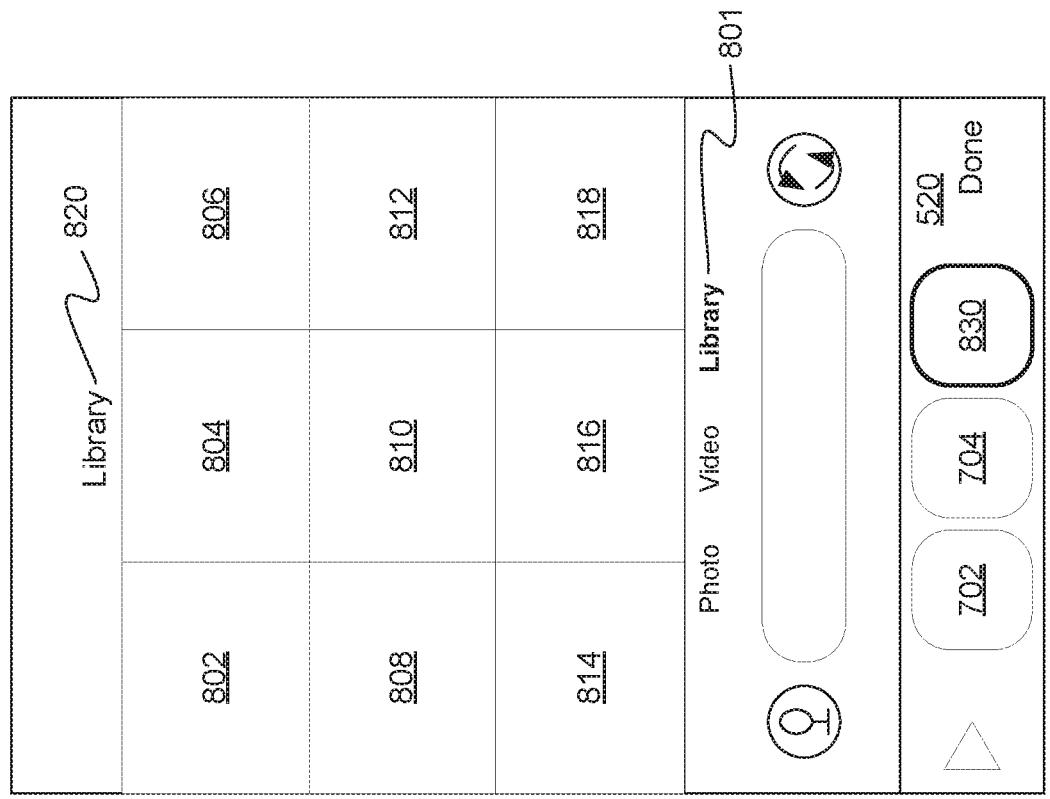
FIG. 8 illustrates an example graphical user interface for creating a clip based on a pre-recorded media item.
Figure 9:
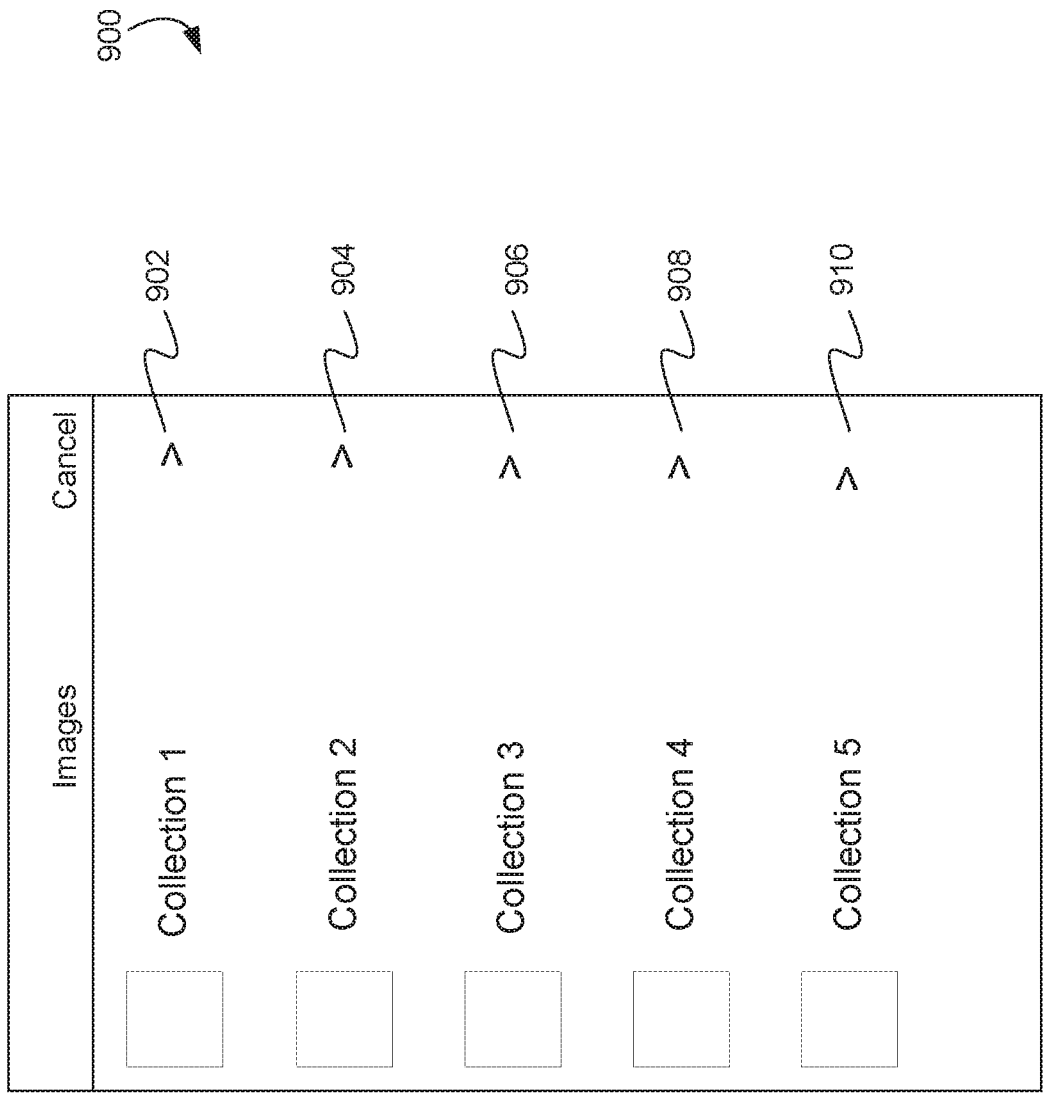
FIG. 9 illustrates an example graphical user interface for browsing a user's media library.

FIG. 8 illustrates an example graphical user interface 800 for creating a clip based on a pre-recorded media item. For example, GUI 800 can be presented by media messaging application 104 in response to receiving user input selecting graphical element 801. When media messaging application 104 receives the selection of graphical element 801, media messaging application 104 can present media items from the user's media library (e.g., media database 112). Media messaging application 104 can present an collection of media items 802-818 (e.g., the most recently accessed or captured media items) on GUI 800 so that the user can quickly select a media item from which to generate a new clip. Alternatively, the user can select graphical element 820 to browse the user's media library, as illustrated by FIG. 9. In some implementations, the user can interact with GUI 800 to select a media item for a new clip from a remote source (e.g., a network server, website, etc.).

When media messaging application 104 receives a selection of a media item, media messaging application 104 can generate a new clip in the currently selected media message. For example, if the media item is a movie, media messaging application 104 can create a new clip and store the movie's video data as the image asset for the clip and the movie's audio data as the audio asset for the clip. Media messaging application 104 can send the movie's audio data to dictation service 110 to translate the speech portions of the audio data into transcription data (e.g., text, tokens, etc.), as described above. After the new clip is created based on the selected media item, media messaging application 104 can present a representation of the new clip 830 in area 520.

FIG. 9 illustrates an example graphical user interface 900 for browsing a user's media library. For example, GUI 900 can be presented by media messaging application 104 in response to the user selecting graphical element 820 of FIG. 8. The user can interact with graphical elements 902-910 to browse various media item collections and select media items (e.g., image, video, movie, audio, etc.) for generating new clips for the media message.

Figure 10:
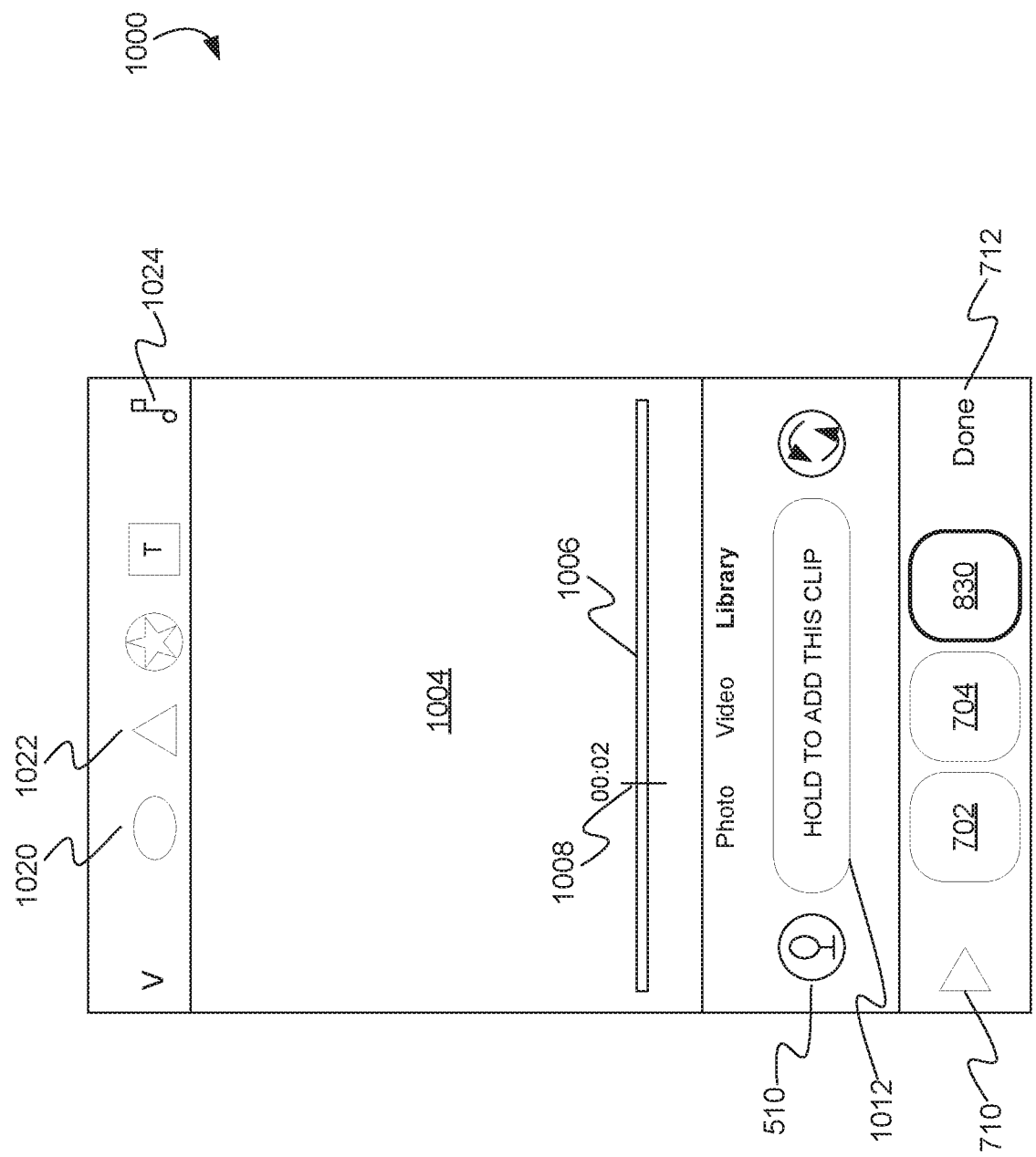
FIG. 10 illustrates an example graphical user interface for editing a clip in a media message.

FIG. 10 illustrates an example graphical user interface 1000 for editing a clip in a media message. For example, GUI 1000 can be presented by media messaging application 104 in response to the user selecting a clip (e.g., clip 702, clip 704, clip 830) in a media message.

In some implementations, a user can interact with GUI 1000 to record audio data for an existing clip. For example, the user can record audio data to add to a selected clip. The user can record audio to replace audio data in a selected clip. To record the new audio data, the user can select graphical element 1012. In this case, since an existing clip 830 having existing video data has been selected, when the user selects graphical element 1012, media messaging application 104 can present the pre-recorded video data (e.g., still image, movie, etc.) in area 1004 and record new audio data (e.g., using microphone 108) for the corresponding clip.

In some implementations, the newly recorded audio data can be stored with on offset that indicates when to start playback of the audio data with respect to the video data. For example, GUI 1000 can present a playback timeline 1006 for the corresponding video data in the selected clip. The user can move graphical element 1008 along timeline 1006 (e.g., by dragging graphical element 1008 along timeline 1006, by playing the selected clip) to select a position within the video data. After moving graphical element 1008 to a position on the timeline (e.g., the 2 second mark), the user can select graphical element 1012 to initiate recording new audio for the selected clip and media messaging application 104 can store the audio data start offset (e.g., in audio asset attribute 334). Media messaging application 104 can continue recording audio data while the user continues to provide input to graphical element 1012, as described above with respect to graphical element 514. Releasing (e.g., ceasing to provide input) graphical element 514 can cause media messaging application 104 to stop recording the audio data. If the user stops recording audio data before the end of the video data, media messaging application 104 can determine the audio data end offset and store the audio data end offset (e.g., in audio asset attribute 334). When the selected clip is later played back (e.g., as part of a media message or during editing), media messaging application 104 can start and end playback of the audio data according to the start and end offset data for the audio data. For example, the start and end offset data for audio data (e.g., a clip's audio asset) can be determined with respect to the beginning of the video data in the corresponding clip.

In some implementations, media messaging application 104 can trim a clip based on audio data offset values. For example, when a user specifies a start offset and/or an end offset for a clip's audio data, as described above, media messaging application 104 can trim the corresponding video data so that the video data starts and stops at the clips audio data offsets. In this case, the audio data offsets can be stored as trim values in trim data attribute 348, as described above. Thus, recording audio data in the middle of video data playback can be interpreted by media messaging application 104 as an implicit instruction to trim the clip according to the start and end offsets for the audio data.

In some implementations, GUI 1000 can include graphical element 1024 for selecting an audio soundtrack for the currently selected media message. For example, the user can move graphical element 1008 (e.g., a handle, cursor, position indicator, etc.) along timeline 1006 or leave graphical element 1008 at the beginning of timeline 1006 to select a start time for an audio soundtrack. The user can then select graphical element 1024 to invoke a media browser and select a song, track, music file, or other audio track as the soundtrack for the currently selected media message. Media messaging application 104 can store the identifier for the selected audio track and the start time (e.g., time offset from the beginning of the currently selected clip) in audio asset attribute 312 and/or start time attribute 314 of the media message, as described above with respect to FIG. 3. When the media message is played, media messaging application 104 can start playback of the selected soundtrack at a time corresponding to the stored start time.

In some implementations, GUI 1000 can include graphical element 1020 to enable or disable automatic titling for the selected clip. As described above, in near real time while recording audio data, media messaging application 104 can transcribe speech in the audio data stream into transcription data (e.g., text). The transcription data can be presented overlaid on the video data presented in area 1004 in near real time while recording audio data and/or video data. The user can invoke a graphical user interface (e.g., GUI 1100) to enable and/or disable transcription (e.g., titling, captioning, etc.) and/or select a titling style for presenting transcription data by selecting graphical element 1020.

In some implementations. GUI 1000 can include graphical element 1022 to enable or disable video data filtering for the selected clip. For example, the user can invoke a graphical user interface (e.g., GUI 1200) for selecting various filters to apply to the video data by selecting graphical element 1022.

Figure 11:
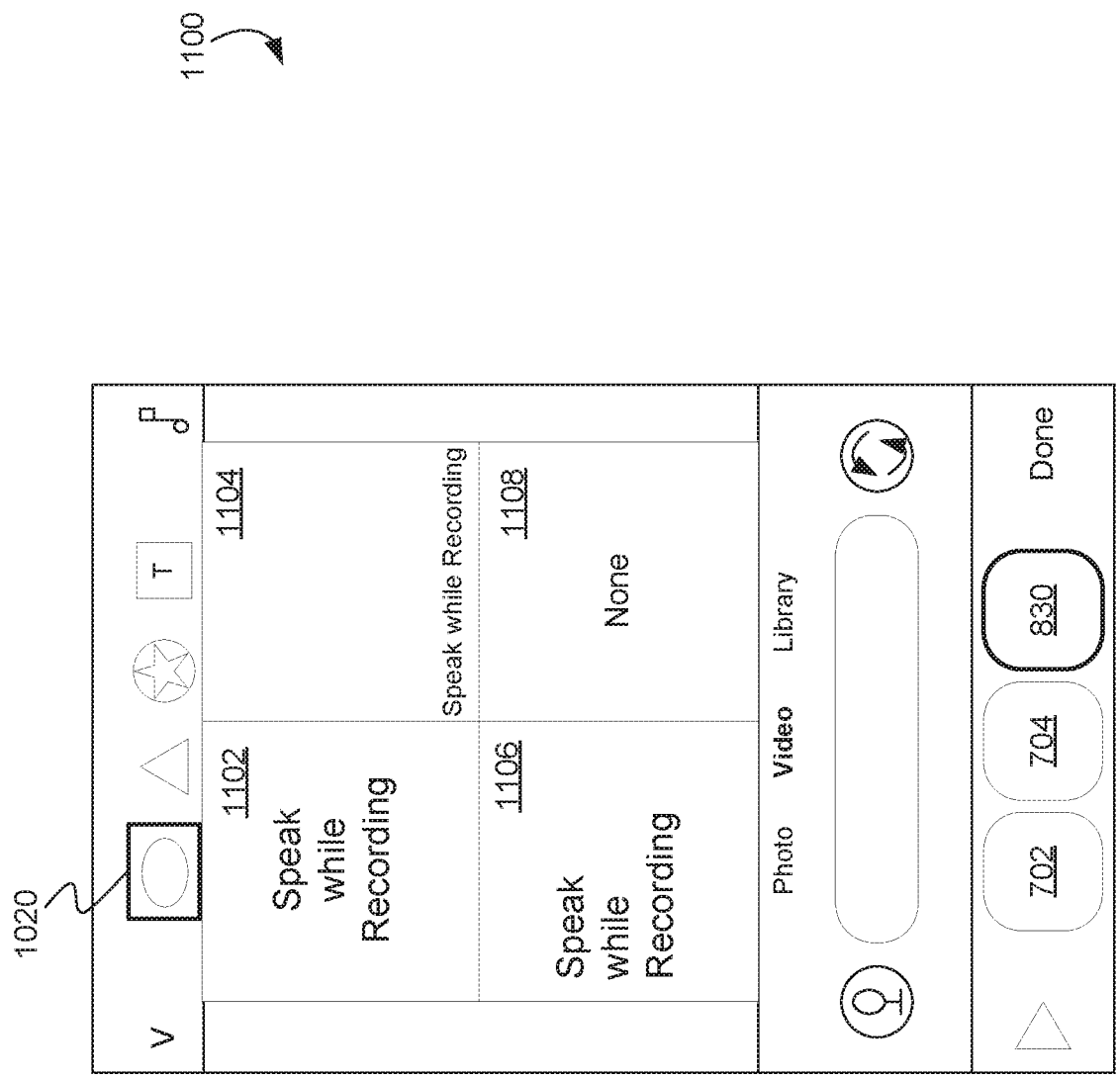
FIG. 11 illustrates an example graphical user interface for selecting a titling style.

FIG. 11 illustrates an example graphical user interface 1100 for selecting a titling style. For example, media messaging application 104 can present GUI 1100 in response to the user selecting graphical element 1020.

In some implementations, GUI 1100 can present representations 1102, 1104, 1106, 1108) of various titling styles that can be applied to a selected clip (e.g., clip 830). For example, each titling style can define how transcription data associated with the selected clip is presented when the clip is played back by media messaging application 104. For example, a titling style can define font, font size, text location, number of words to present at one time, the number of lines to present at one time, and/or various animations for presenting text (e.g., transcription data) when playing back the selected clip. Many different titling styles can be defined in media messaging application 104. The user can select a titling style for the selected clip from the titling styles represented on GUI 1100.

When a titling style is selected for a clip, media messaging application 104 will send audio data for the clip to dictation service 110 to cause dictation service 110 to generate transcription data for the clip, as described above. When a titling style is selected for a clip, media messaging application 104 will present the transcription data generated for the clip during recording and/or playback of the corresponding clip, as described above. If the user does not wish to have transcription data generated and/or presented for a clip, the user can select graphical element 1108 to indicate that no titling should be performed. Media messaging application 104 can store the selected titling style in titling style attribute 352 for the selected clip. Media messaging application 104 will apply the titling style to the clip (e.g., to the transcription data) when the clip is subsequently played back and/or presented on a display of user device 102.

Figure 12:
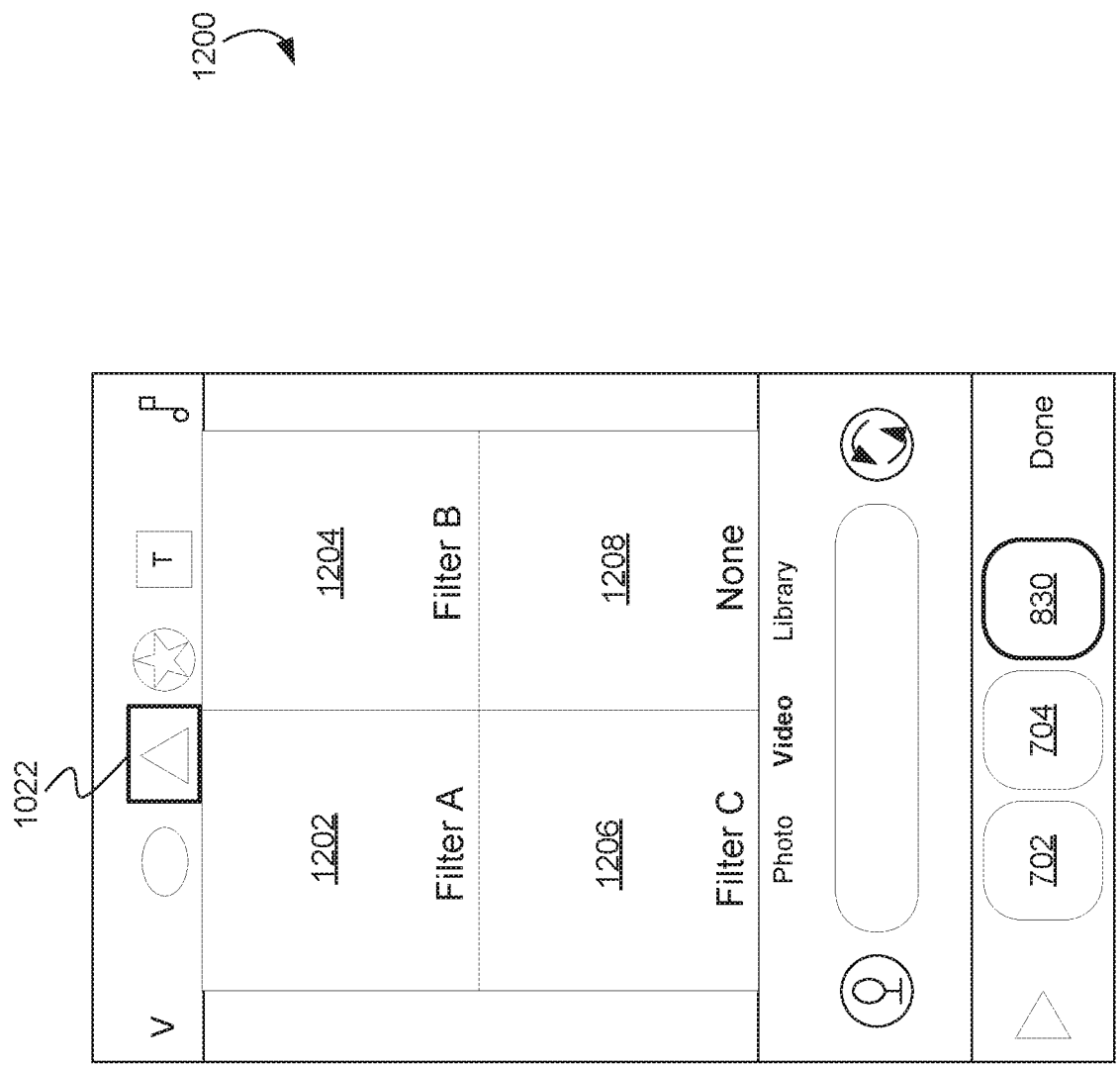
FIG. 12 illustrates an example graphical user interface for selecting an image filter for a clip.

FIG. 12 illustrates an example graphical user interface 1200 for selecting an image filter for a clip. For example, media messaging application 104 can present GUI 1200 in response to receiving user input selecting graphical element 1022. GUI 1200 can present various preconfigured filters (e.g., color filters, effects, etc.) for changing how video data is presented by media messaging application 104 and/or user device 102. For example, graphical elements 1202, 1204, 1206, and/or 1208 can represent various filters (or no filter for graphical element 1208) configured in media messaging application 104. The user can select an image filter to cause the media messaging application 104 to filter the video data (e.g., image data, image asset) for the clip using the image filter. After the user selects a filter, media messaging application 104 can store an identifier for the filter in the filter data attribute for the corresponding clip. Later when the clip is presented on user device 102, media messaging application 104 can apply the selected filter to adjust how the video data associated with the clip is presented.

Figure 13:
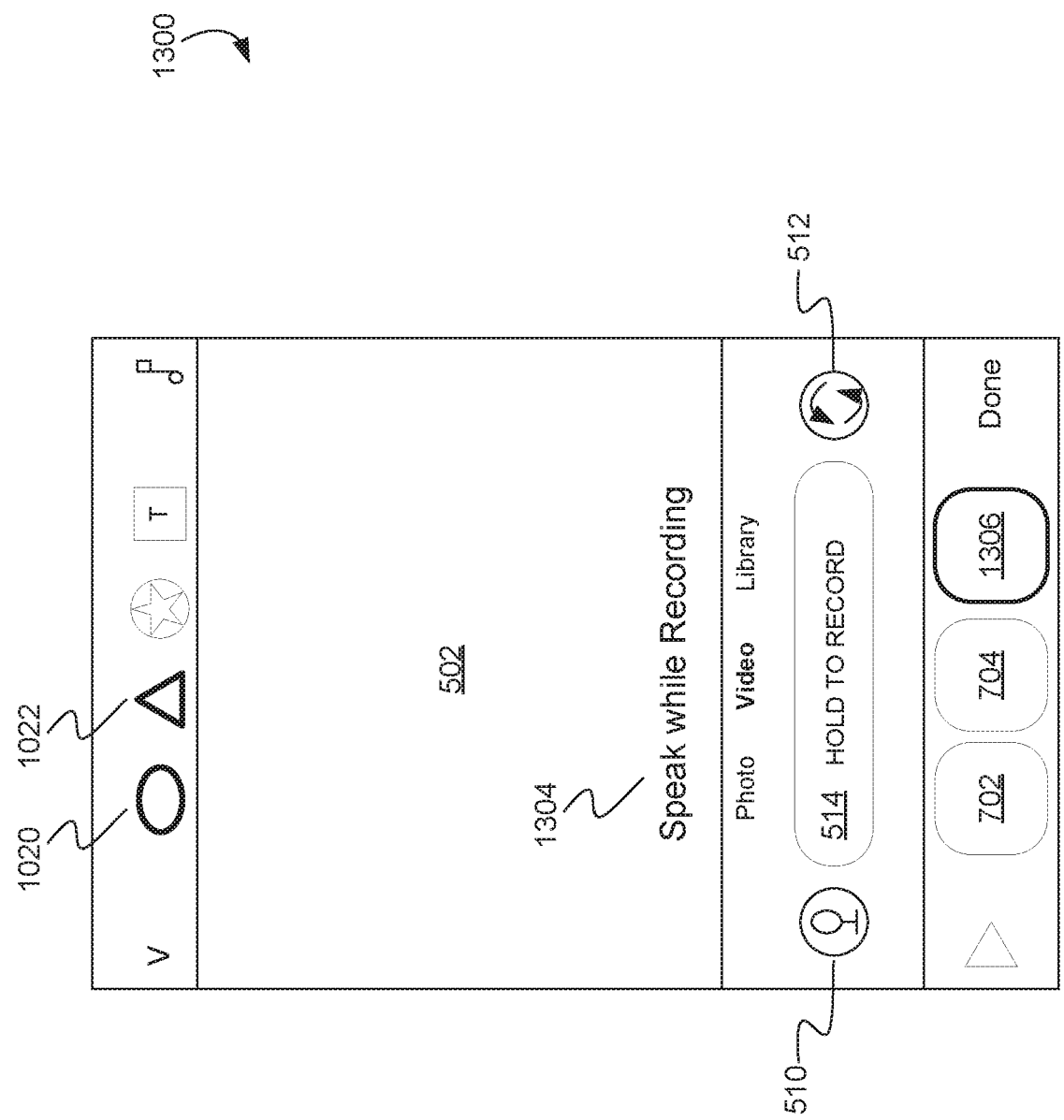
FIG. 13 illustrates an example graphical user interface for generating a clip having automatic titling.

FIG. 13 illustrates an example graphical user interface 1300 for generating a clip having automatic titling. For example, GUI 1300 can correspond to GUI 500 of FIG. 5. However, in this case, the user has selected automatic titling, as indicated by the highlighted graphical element 1020, and the user has selected an image filter, as indicated by the highlighted graphical element 1022. Since automatic titling is selected for clip 1306, when the user selects and holds graphical element 514, media messaging application 104 will obtain an audio stream from microphone 108 and send the audio stream to dictation service 110 to generate transcription data for clip 1306. As described above, media messaging application 104 will transcribe the audio stream (e.g., audio data) in near real time while the audio stream and/or video data is being recorded and present the transcribed audio data (e.g., text 1304) in area 502 according to the presentation style defined by the titling style selected by the user. Because the user has selected a titling style, media messaging application 104 will obtain a transcription of the audio data even if the user has turned off voiceovers by selecting graphical element 510. Thus, media messaging application 104 may generate and store transcription data for a clip while not persistently storing the corresponding audio data (e.g., when voiceovers are turned off).

Figure 14:
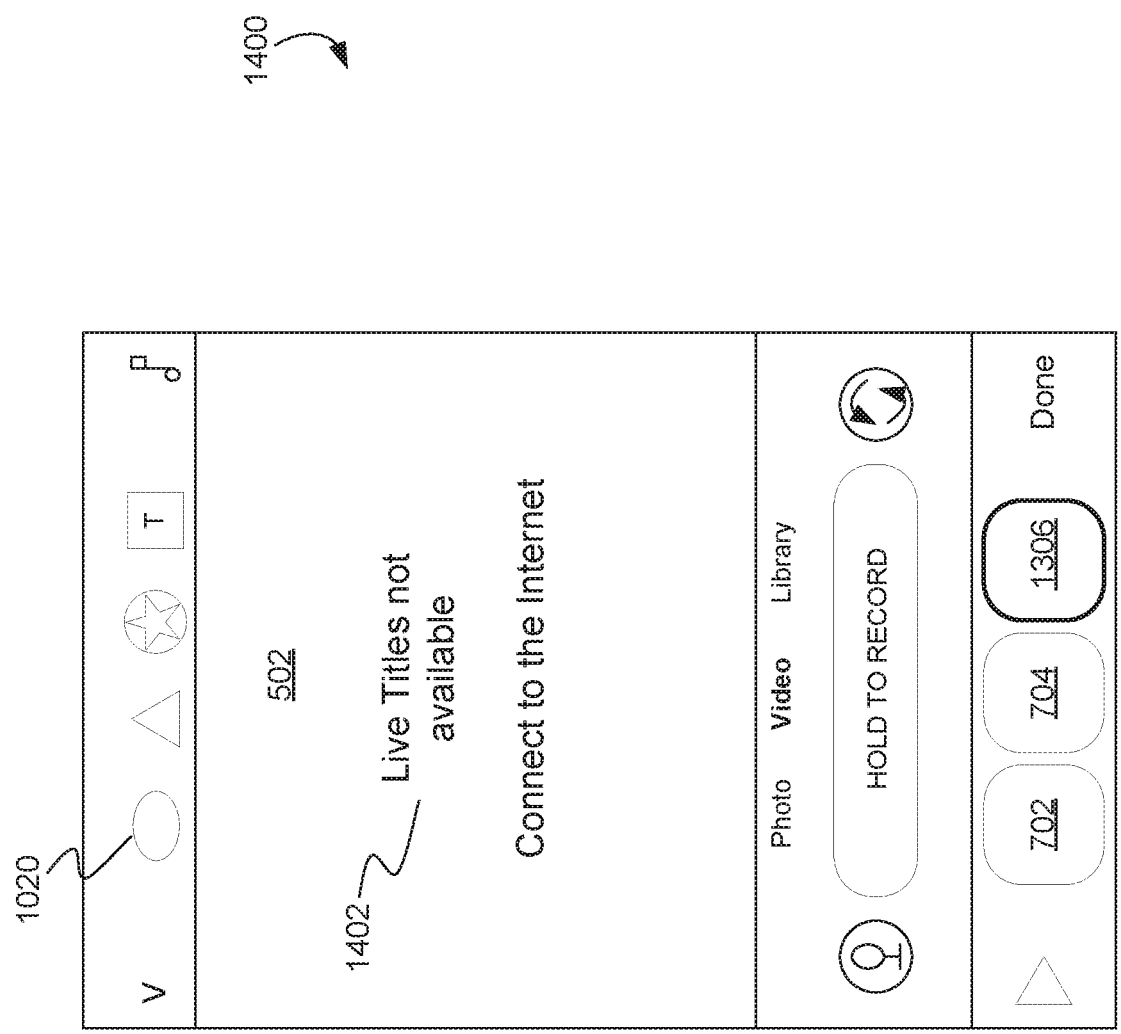
FIG. 14 illustrates an example graphical user interface indicating that automatic titling is not available.

FIG. 14 illustrates an example graphical user interface 1400 indicating that automatic titling is not available. For example, GUI 1400 can be presented in response to the user selecting graphical element 1020 when user device 102 does not have a network connection. As described above, dictation service 110 may communicate with a network based dictation service to obtain transcriptions of recorded audio speech data. When user device 102 is not connected to the network, dictation service 110 may not be able to obtain transcription data for an audio stream. Thus, when a user selects graphical element 1020 to enable automatic titling and media messaging application 104 determines that user device 102 does not have a network connection, media messaging application 104 can present a message 1402 indicating that the automatic titling feature of media messaging application 104 is unavailable and that the user should connect user device 102 to the network. Media messaging application 104 may remove message 1402 after a period of time has passed (e.g., 1 second, 2 seconds, etc.). Media messaging application 104 may remove message 1402 in response to the user providing input (e.g., touch input, a tap, etc.) in area 502.

Figure 15:
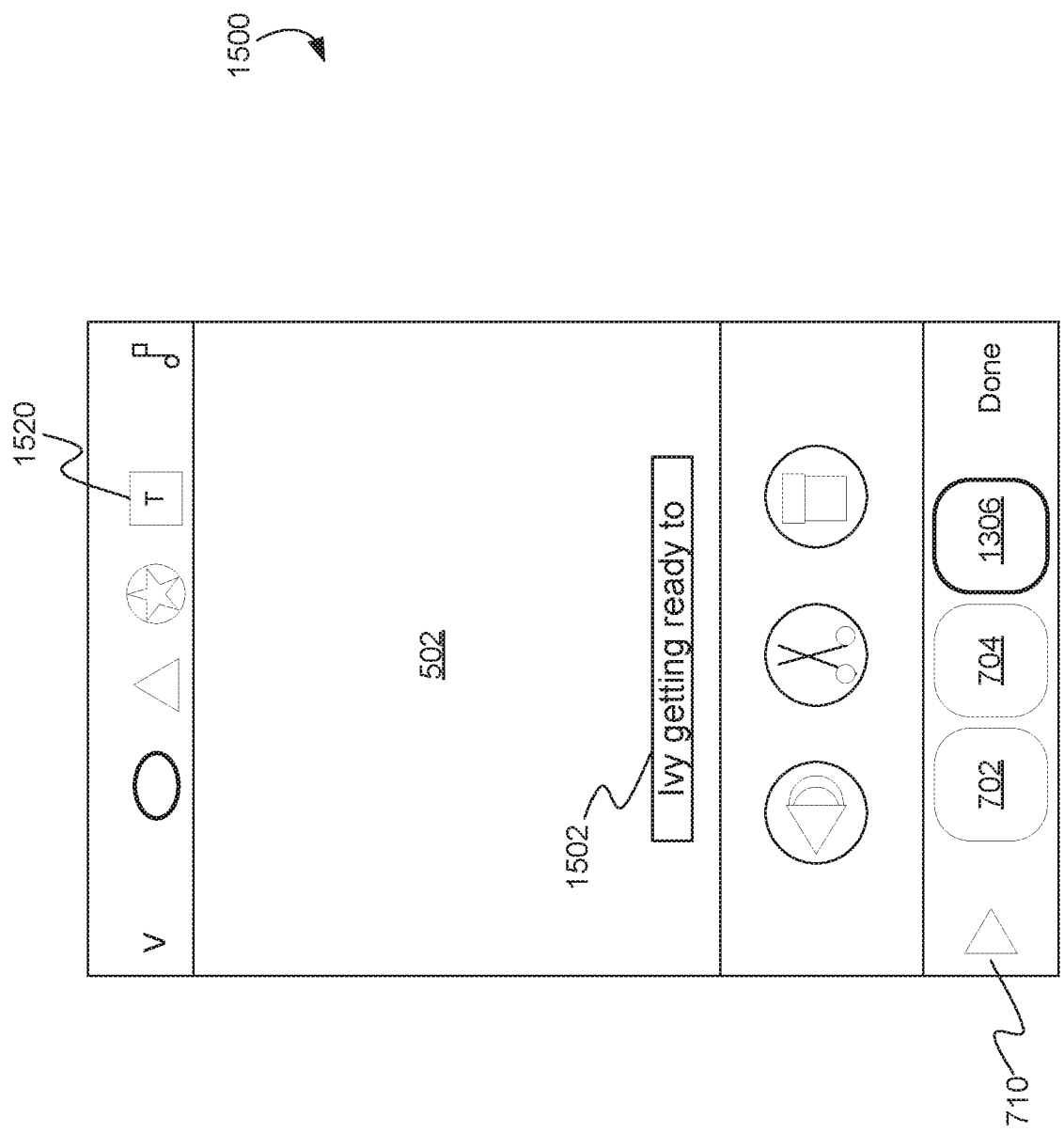
FIG. 15 illustrates an example graphical user interface for editing a transcription data associated with a clip.

FIG. 15 illustrates an example graphical user interface 1500 for editing a transcription data associated with a clip. For example, GUI 1500 can be presented by media messaging application 104 while presenting a clip that has automatic titling enabled. For example, while presenting clip 830, media messaging application 104 can present transcription data 1502 (e.g., titling, captioning, text, etc.) that was previously generated for clip 830. If the user wants to edit transcription data 1502, the user can select (e.g., tap, touch, etc.) on transcription data 1502 to enable editing of transcription data 1502. After selecting transcription data 1502, the user can provide input to GUI 1500 to manipulate transcription data 1502. For example, the user can move transcription data 1502 to a different location in area 502. The user can change the size of transcription data 1502 by stretching or pinching transcription data 1502.

In some implementations, GUI 1500 can include graphical element 1520 for editing the tokens (e.g., text) associated with transcription data 1502. For example, in response to receiving user input selecting graphical element 1520, media editing application 104 can present token editing graphical user interface 1600.

Figure 16:
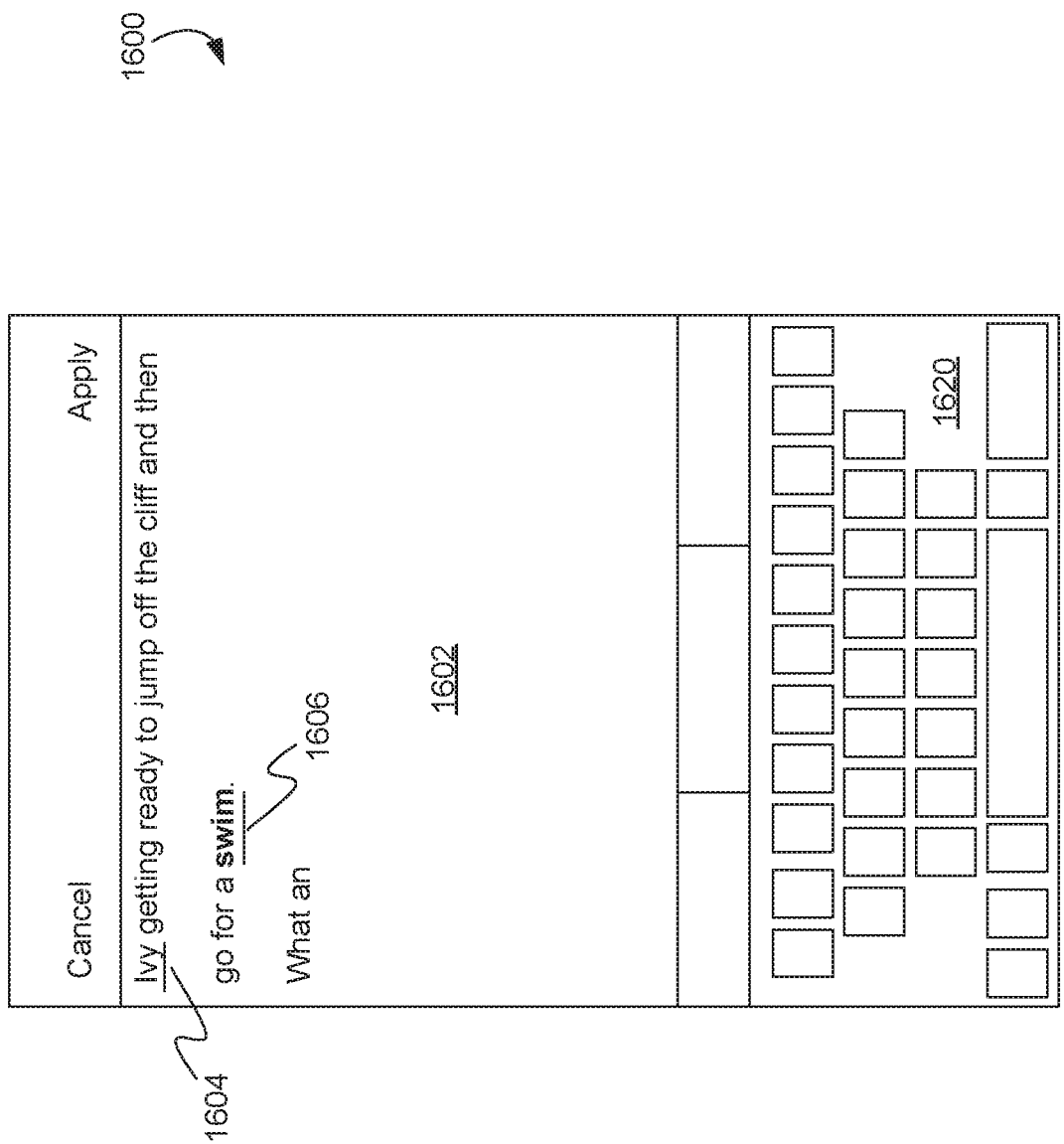
FIG. 16 illustrates an example graphical user interface for editing tokens associated with transcription data.

FIG. 16 illustrates an example graphical user interface 1600 for editing tokens associated with transcription data. For example, GUI 1600 can be presented by media messaging application 104 in response to receiving user input selecting graphical element 1520. GUI 1600 can present transcription data (e.g., text, tokens, etc.) associated with clip 1306 being presented on GUI 1500. GUI 1600 can present the transcription text and identify tokens within the transcription text. For example, media messaging application 104 can identify tokens in the transcription text using underlining. For example, underline 1604 indicates that the word "Ivy" is associated with a token. Underline 1606 indicates that the word "swim" is associated with another token.

To edit a token, the user can select (e.g., tap, touch, etc.) a word corresponding to the token the user wishes to edit. For example, the user can select the word "swim" to edit the corresponding token associated with underline 1606. After the user selects a token, the user can provide input to virtual keyboard 1620 to define new or modified text for the selected token, as illustrated by FIG. 17.

Figure 17:
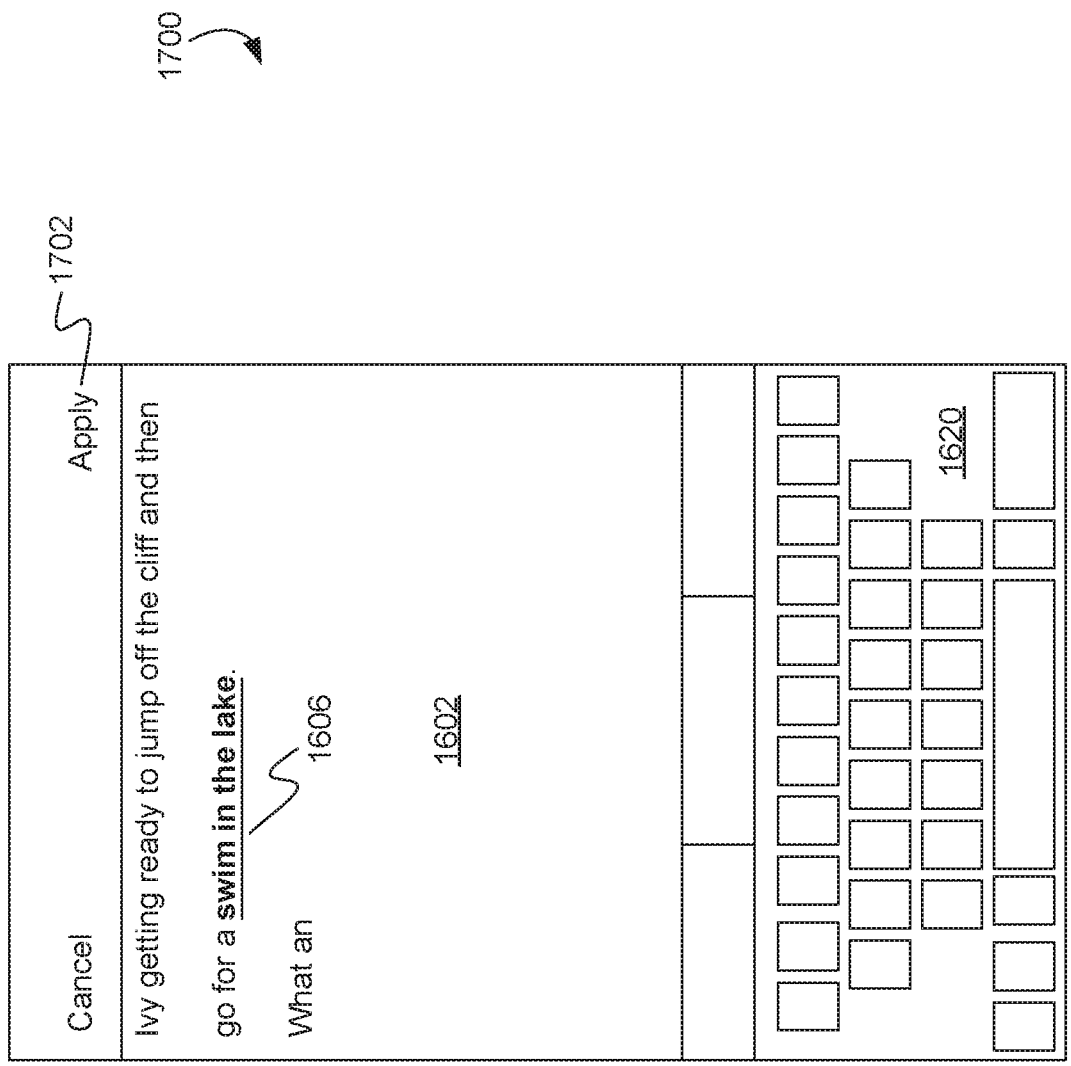
FIG. 17 illustrates an example graphical user interface for saving an edited token.

FIG. 17 illustrates an example graphical user interface 1700 for saving an edited token. For example, GUI 1700 can correspond to GUI 1600 described above. However. GUI 1700 shows the modified or edited text associated with token 1606. For example, the user has changed the text for token 1606 from "swim" to "swim in the lake." When the user is satisfied with the edits made to token 1606, the user can select graphical element 1702 to save the edited transcription data (e.g., tokens). For example, media messaging application 104 can save the user specified text for token 1606 in the user text attribute of the corresponding token, as described above with reference to FIG. 4. Later, when clip 1306 is presented in a media message, media messaging application 104 can present the user edited text for token 1606 instead of the word candidate associated with the token that has the highest confidence score, as described above.

Example Processes

To enable the reader to obtain a clear understanding of the technological concepts described herein, the following processes describe specific steps performed in a specific order. However, one or more of the steps of a particular process may be rearranged and/or omitted while remaining within the contemplated scope of the technology disclosed herein. Moreover, different processes, and/or steps thereof, may be combined, recombined, rearranged, omitted, and/or executed in parallel to create different process flows that are also within the contemplated scope of the technology disclosed herein. Additionally, while the processes below may omit or briefly summarize some of the details of the technologies disclosed herein for clarity, the details described in the paragraphs above may be combined with the process steps described below to get a more complete and comprehensive understanding of these processes and the disclosed technologies.

Figure 18:
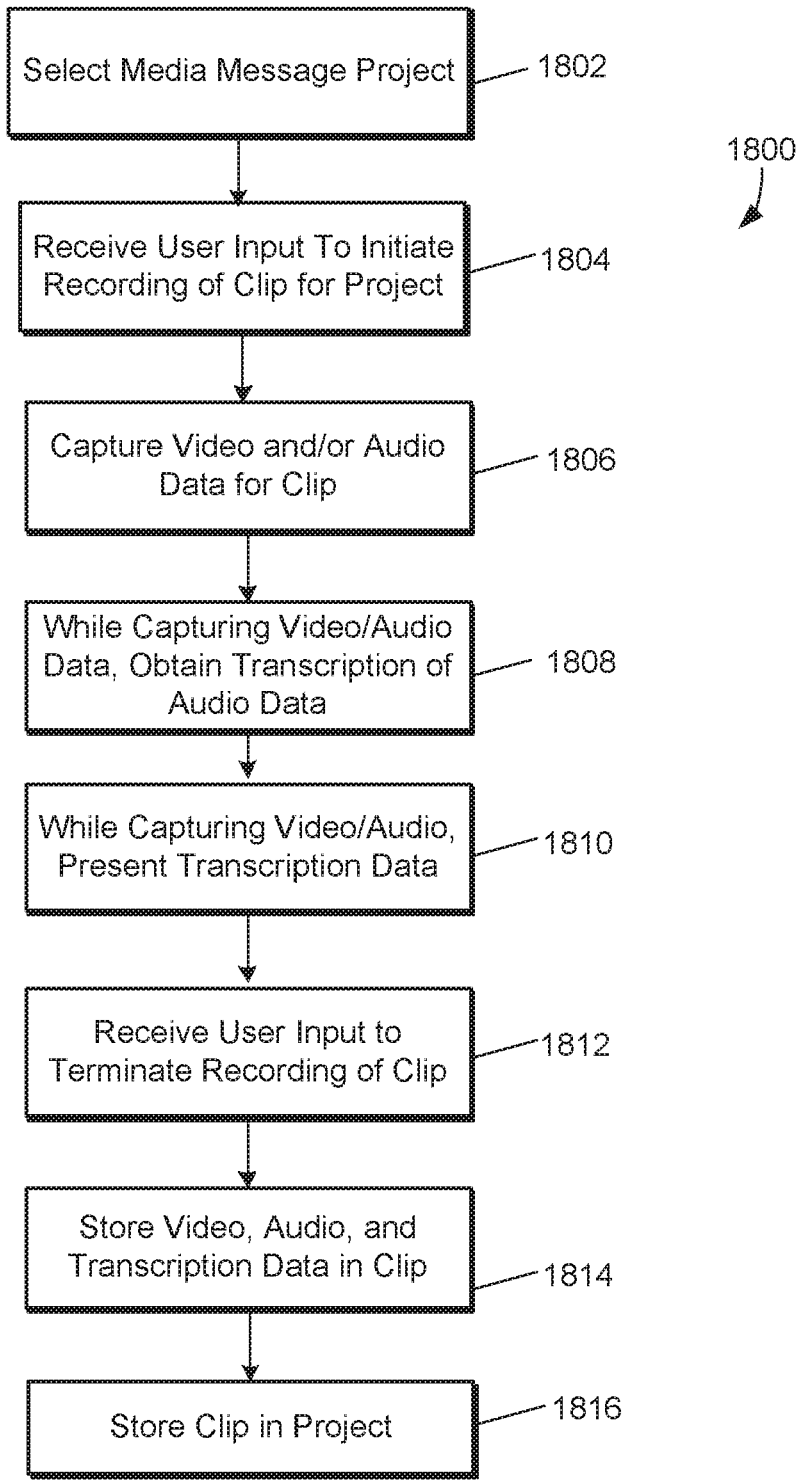
FIG. 18 is flow diagram of an example process for generating a clip for a media message by capturing audio and/or video data.

FIG. 18 is flow diagram of an example process 1800 for generating a clip for a media message by capturing audio and/or video data. For example, process 1800 can be performed by media messaging service 104 to create a media message and/or create a clip for the media message by capturing audio and/or video data using a camera and/or microphone of user device 102, as described above.

At step 1802, a computing device can select a media message project. For example, when a user invokes media messaging application 104 on user device 102, media messaging application 104 can create (e.g., select) a new media message project. Alternatively, the user can interact with media messaging application 104 to select a pre-existing media message project.

At step 1804, the computing device can receive user input to initiate recording of a clip for the project. For example, the user can provide input to media messaging application 104 indicating whether the user wishes to capture a still image or record a movie for the new clip. The user can then provide input to a graphical element (e.g., button) of media messaging application 104 to begin recording the data for the new clip.

At step 1806, the computing device can capture video and/or audio data for the clip. For example, while the user continues to provide input to the recording graphical element, media messaging application 104 can capture video data (e.g., still image, movie, etc.) using the camera of user device 102 and/or audio data using the microphone of user device 102.

At step 1808, the computing device can obtain transcription data corresponding to the captured audio data while capturing the video and/or audio data for the new clip. For example, media messaging application 104 can determine whether the user has selected a titling style for the new clip. If the user has selected a titling style, then media messaging application 104 can obtain transcription data, including text, representing or corresponding to speech data in the captured audio data.

At step 1810, the computing device can present the transcription data while capturing the audio and/or video data. For example, media messaging application 104 can obtain transcription data for portions of the audio data as the audio data is generated or captured. For example, media messaging application 104 can obtain transcription data for every second of captured audio data, as described above. When media messaging application 104 obtains the transcription data for a portion of audio data, media messaging application 104 can present the transcription data as an overlay to the video data being simultaneously presented on the display of user device 102, as described above. Thus, media messaging application 104 can present transcription data (e.g., text, titling, captioning, etc.) corresponding to the speech captured in the audio data in near real time as the audio data and/or video data is being recorded by media messaging application 104.

At step 1812, the computing device can receive user input to terminate the recording of the clip. For example, the user input in this case can be ceasing to provide user input to the recording graphical element described above. For example, media messaging application 104 will continue to record audio and/or video data while the user continues to provide user input to the recording graphical elements. When the user stops providing input to the recording graphical element, media messaging application 104 can stop recording the audio and/or video data for the new clip.

At step 1814, the computing device can store the video data, audio data, and/or transcription data in association with the clip. For example, media messaging application 104 can store the video data, audio data, and/or transcription data on user device 102. Media messaging application 104 can store references (e.g., identifiers, URLs, etc.) that point to where the video data, audio data, and/or transcription data is stored on user device 102 in the clip data structure for the new clip, as described above.

At step 1816, the computing device can store the new clip in association with the selected media message project. For example, media messaging application 104 can store the new clip in the media message data structure described above. If the media message already includes other clips, the new clip can be added to the end of the sequence of clips in the media message, as described above.

Figure 19:
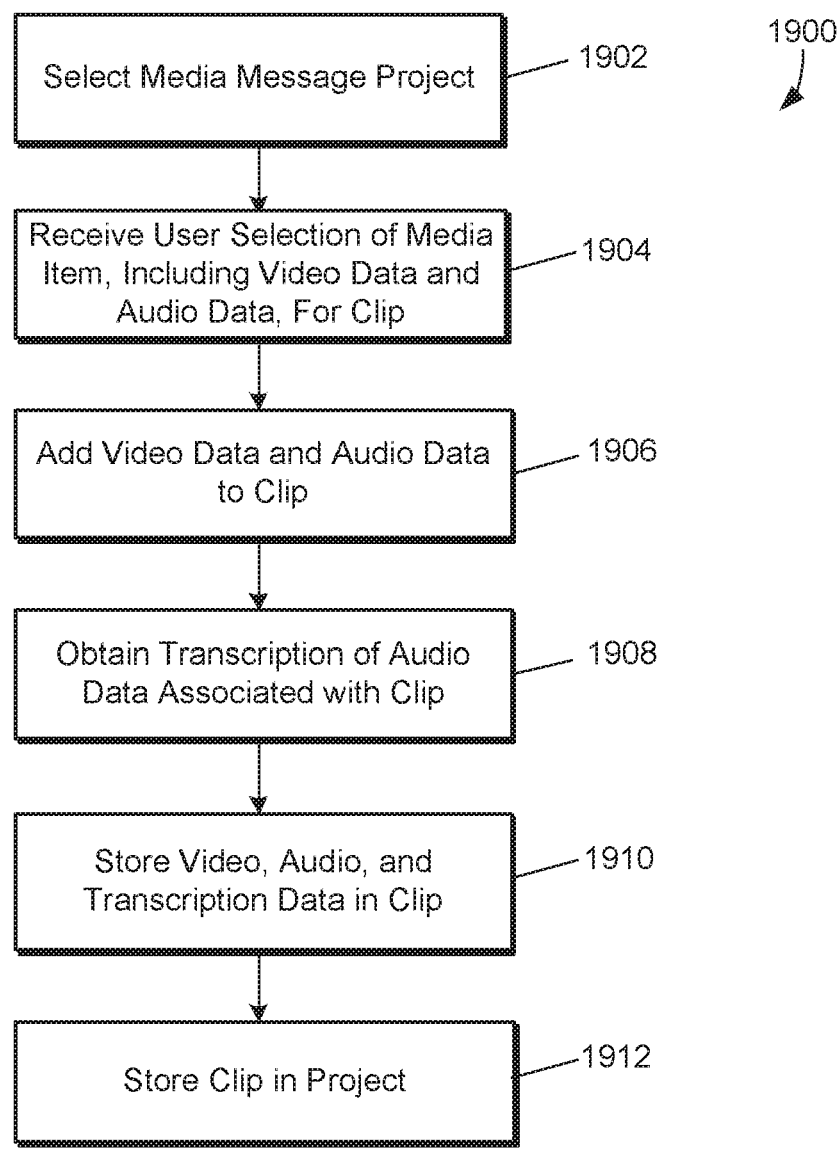
FIG. 19 is flow diagram of an example process for generating a clip for a media message based on a pre-recorded media item.

FIG. 19 is flow diagram of an example process 1900 for generating a clip for a media message based on a pre-recorded media item. For example, process 1900 can be performed by media messaging service 104 to create a media message and/or create a clip for the media message by importing audio and/or video data from a selected pre-recorded media item, as described above.

At step 1902, a computing device can select a media message project. For example, when a user invokes media messaging application 104 on user device 102, media messaging application 104 can create (e.g., select) a new media message project. Alternatively, the user can interact with media messaging application 104 to select a pre-existing media message project.

At step 1904, the computing device can receive user input selecting a media item for a new clip. For example, the media item may include video data and/or audio data.

At step 1906, the computing device can add the video data and/or audio data from the media item to the new clip. For example, when the media item is selected through media messaging application 104, media messaging application 104 can add the video data and/or audio data from the media item to the new clip.

At step 1908, the computing device can obtain transcription data corresponding to the audio data associated with the clip. For example, if the user has selected a titling style for the new clip, media messaging application 104 can send the audio data obtained from the selected media item to dictation service 110. Dictation service 110 can generate transcription data corresponding to the audio data and send the transcription data, including text representing speech in the audio data, to media messaging application 104.

At step 1910, the computing device can store the video data, audio data, and/or transcription data in association with the new clip. For example, media messaging application can store the transcription data on user device 102. Media messaging application 104 can then store references to the video data, audio data, and/or transcription data in a clip data structure, as described above.

At step 1912, the computing device can store the clip in the selected media messaging project. For example, media messaging application 104 can store the clip data structure in a media message data structure for the project on user device 102, as described above.

Figure 20:
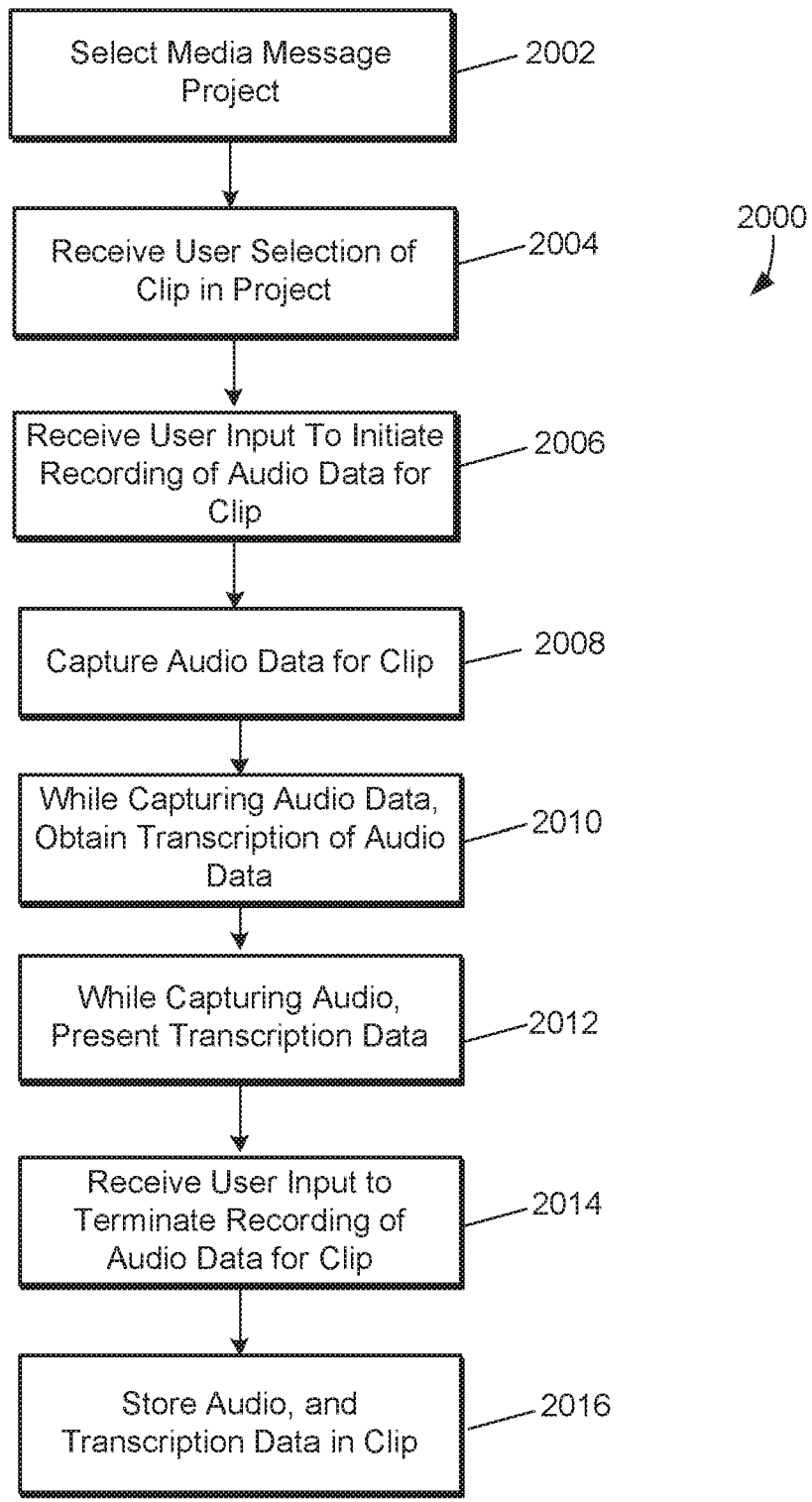
FIG. 20 is flow diagram of an example process for generating audio data and/or transcription data for a clip.

FIG. 20 is flow diagram of an example process 2000 for generating audio data and/or transcription data for a clip. For example, process 2000 can be performed by media messaging service 104 to create a media message and/or create a clip for the media message by generating audio data and/or transcription data for a pre-recorded media item, as described above.

At step 2002, a computing device can select a media message project. For example, when a user invokes media messaging application 104 on user device 102, media messaging application 104 can create (e.g., select) a new media message project. Alternatively, the user can interact with media messaging application 104 to select a pre-existing media message project.

At step 2004, the computing device can receive user input selecting a clip in the media message project. For example, the user can select a clip by creating a new clip based on a pre-recorded media item and continuing to edit or modify the clip. The user can select a clip from a sequence of clips associated with the media messaging project and presented on a GUI of media messaging application 104, as described above.

At step 2006, the computing device can receive user input to initiate recording of audio data for the clip. For example, media messaging application 104 can receive user input selecting the recording graphical element (e.g., button) described above.

At step 2008, the computing device can capture audio data for the selected clip. For example, when the clip was generated based on a pre-recorded media item, the user can provide input to media messaging application 104 selecting and holding the recording graphical element (e.g., button) described above to record new audio data for the clip. Since a pre-recorded media item was selected for the clip, media messaging application 104 will not record new video data for the clip. However, media messaging application 104 will play back the video data associated with the clip and capture new audio data for the clip while the user continues to provide input to the recording graphical element.

At step 2010, the computing device can obtain transcription data of the audio data while capturing the audio data. For example, if the user has selected a titling style for the selected clip, media messaging application 104 can send the captured audio data to dictation service 110 to generate transcription data representing the speech in the audio data. Dictation service 110 can then return the transcription data to media messaging application 104.

At step 2012, the computing device can present the obtained transcription data while capturing the audio data. For example, media messaging application 104 can obtain transcription data for portions of the audio data as the audio data is generated or captured. For example, media messaging application 104 can obtain transcription data for every second of captured audio data, as described above. When media messaging application 104 obtains the transcription data for a portion of audio data, media messaging application 104 can present the transcription data as an overlay to the video data being simultaneously presented on the display of user device 102, as described above. Thus, media messaging application 104 can present transcription data (e.g., text, titling, captioning, etc.) corresponding to the speech captured in the audio data in near real time as the audio data is being recorded and the video data is being presented by media messaging application 104.

At step 2014, the computing device can receive user input to terminate the recording of audio data for the clip. For example, the user input in this case can be ceasing to provide user input to the recording graphical element described above. For example, media messaging application 104 will continue to record audio data while the user continues to provide user input to the recording graphical element. When the user stops providing input to the recording graphical element, media messaging application 104 can stop recording the audio data for the clip.

At step 2016, the computing device can store the audio data, and/or transcription data in association with the clip. For example, media messaging application 104 can store the audio data, and/or transcription data on user device 102. Media messaging application 104 can store references (e.g., identifiers, URLs, etc.) that point to where the audio data, and/or transcription data is stored on user device 102 in the clip data structure for the clip within the selected media message project, as described above.

Figure 21:
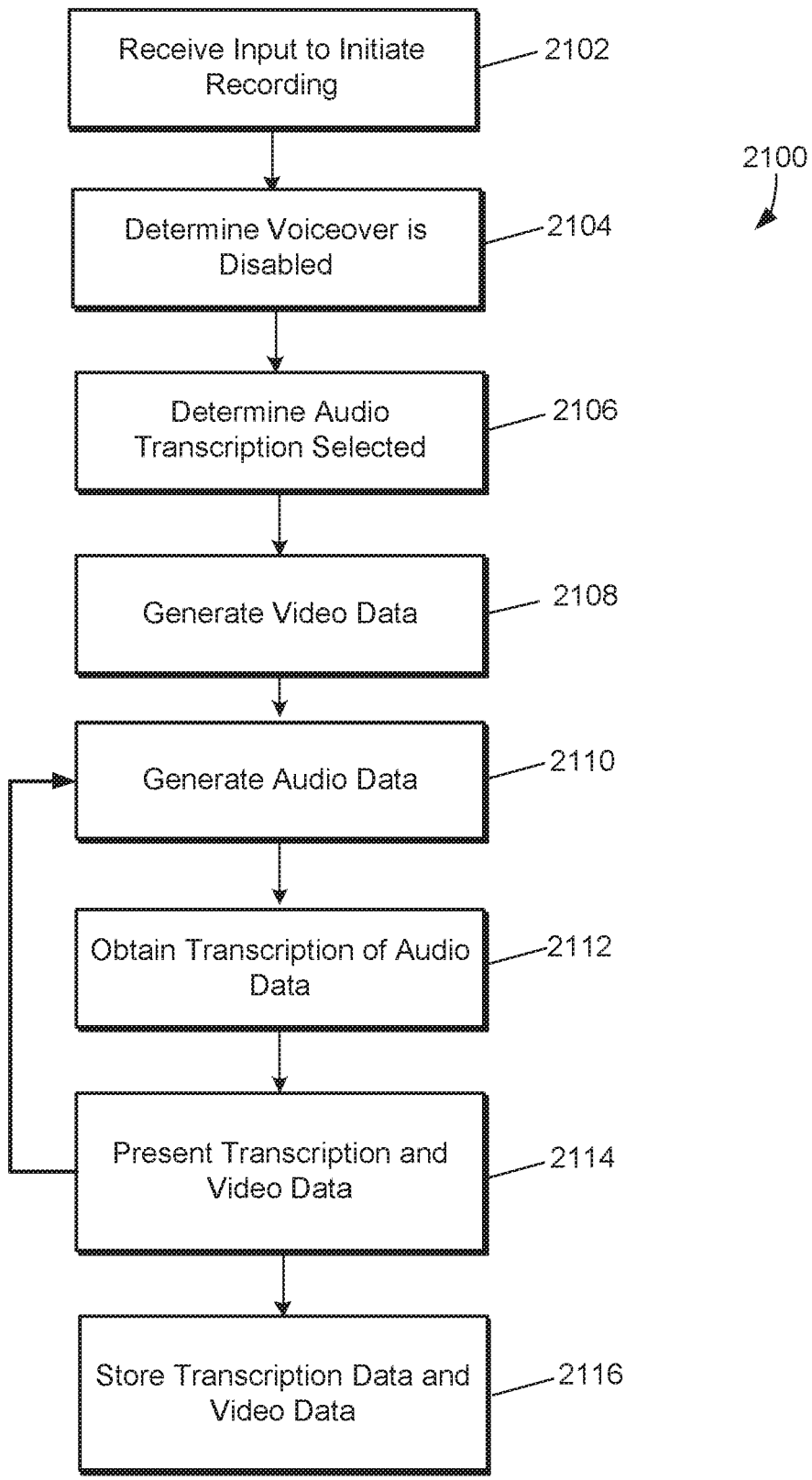
FIG. 21 is a flow diagram of an example process for generating a clip when a titling style is selected and voiceover is disabled.

FIG. 21 is a flow diagram of an example process 2100 for generating a clip when a titling style is selected and voiceover is disabled. For example, process 2100 can be performed by media messaging application 104 to generate a clip that conforms to the user selected transcription (e.g., titling style) and voiceover options.

At step 2102, a computing device can receive user input to initiate recording of data for a clip in a media message. For example, media messaging application 104 can receive user input selecting and holding the recording graphical element 514 described above.

At step 2104, the computing device can determine that voiceover is disabled for the clip. For example, media messaging application 104 can receive user input selecting graphical element 510. In response to receiving the user input to graphical element 510, media messaging application 104 can disable voiceovers for the clip. For example, disabling voiceovers for the clip will prevent media message application 104 from persistently storing audio data received from microphone 108. However, media messaging application 104 may still receive an audio stream from microphone 108 so that transcription data can be generated for the clip.

At step 2106, the computing device can determine that audio transcription was selected by the user for the clip. For example, media messaging application 104 can receive user input selecting a titling style for the clip. When a titling style is selected, media messaging application 104 can obtain transcriptions of audio data (e.g., the audio stream) captured for the clip.

At step 2108, the computing device can generate video data for the clip. For example, media messaging application 104 can capture video data for the clip using camera 106 on user device 102.

At step 2110, the computing device can generate audio data for the clip. For example, media messaging application 104 can capture audio data or receive an audio stream for the clip using microphone 108 on user device 102. Audio data can be captured and transcribed incrementally or iteratively. Thus, at step 2110, the generated audio data may correspond to only a portion of the total audio data captured for the clip when recording is terminated. For example, since voiceovers are disabled for this clip, media messaging application 104 can temporarily store audio data so that a transcription of the speech in the audio data can be performed. The audio data can be deleted from user device 102 after the user stops recording data for the clip and the final transcription is completed.

At step 2112, the computing device can obtain transcription data corresponding to the captured audio data. For example, media messaging application 104 can determine that a titling style was selected by the user (e.g., transcription is enabled) and send the audio data to dictation service 110. Dictation service 110 can generate transcription data based on speech detected in the audio data and return the transcription data to media messaging application 104.

At step 2114, the computing device can present the transcription data overlaid on top of the video data on a display of the computing device. For example, media messaging application 104 can present the transcription data (e.g., candidate words having the highest confidence score) while recording and presenting video data on the display of user device 102. The transcription data can be presented according to the attributes and/or definition of the titling style selected by the user, as described above. If the user continues to record audio and video data for the clip, process 2114 can loop back to step 2110. If the user has terminated recording audio and video data for the clip, the transcription data can be finalized and stored with the video data in the clip at step 2116.

Figure 22:
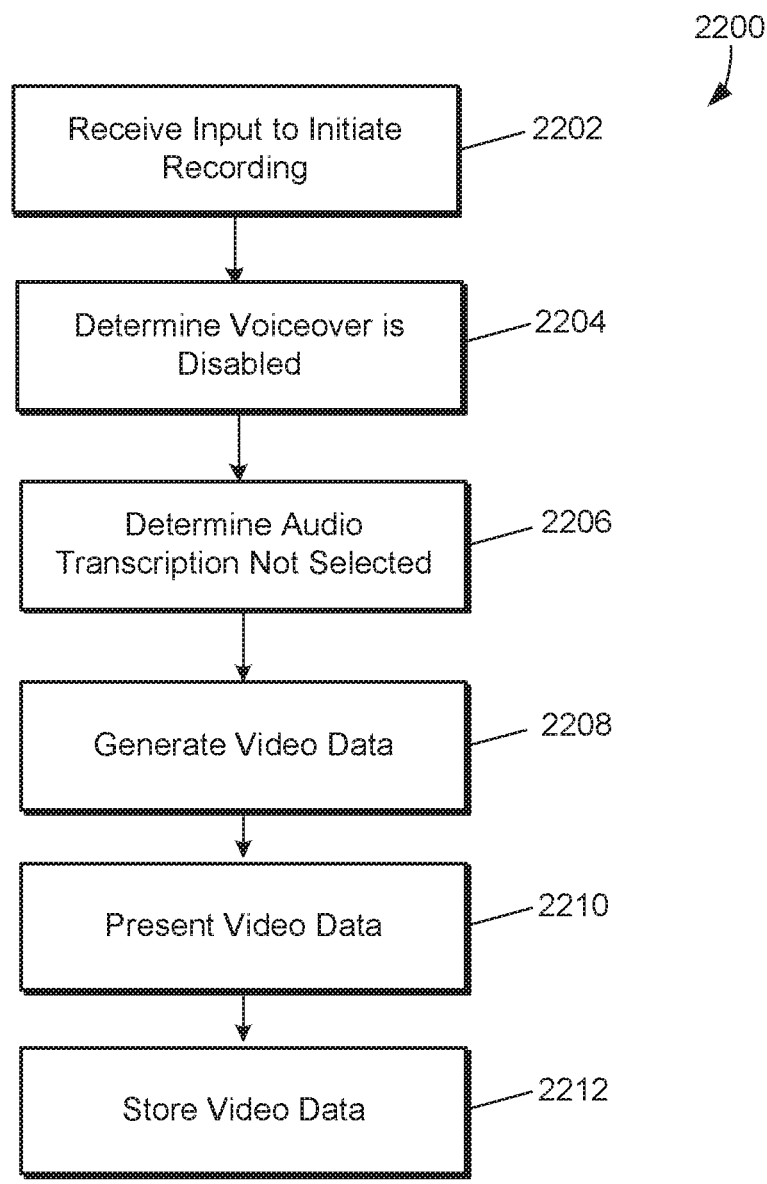
FIG. 22 is a flow diagram of an example process for generating a clip when a titling style is not selected and voiceover is disabled.

FIG. 22 is a flow diagram of an example process 2200 for generating a clip when a titling style is not selected and voiceover is disabled. For example, process 2100 can be performed by media messaging application 104 to generate a clip that conforms to the user selected transcription (e.g., titling style) and voiceover options.

At step 2202, a computing device can receive user input to initiate recording of data for a clip in a media message. For example, media messaging application 104 can receive user input selecting and holding the recording graphical element 514 described above.

At step 2204, the computing device can determine that voiceover is disabled for the clip. For example, media messaging application 104 can receive user input selecting graphical element 510. In response to receiving the user input to graphical element 510, media messaging application 104 can disable voiceovers for the clip. For example, disabling voiceovers for the clip will prevent media message application 104 from persistently storing audio data received from microphone 108. However, media messaging application 104 may still receive an audio stream from microphone 108 so that transcription data can be generated for the clip.

At step 2206, the computing device can determine that audio transcription was not selected by the user for the clip. For example, media messaging application 104 can receive user input selecting "none" as the titling style for the clip. When a titling style is not selected, media messaging application 104 will not obtain transcriptions of audio data (e.g., the audio stream) captured for the clip. When voiceover is disabled and a titling style was not selected, media messaging application 104 can turn off microphone 108 on user device 102 because the audio stream generated by microphone 108 will not be needed for this clip.

At step 2208, the computing device can generate video data for the clip. For example, media messaging application 104 can capture video data for the clip using camera 106 on user device 102. Since no audio data is captured during the recording of the video data for the clip, no audio data transcription is performed.

At step 2210, the computing device can present video data on a display of the computing device. For example, media messaging application 104 can present the video data captured by camera 106 as the video data is being captured.

At step 2212, the computing device can store the video data in association with the clip. For example, media messaging application 104 can store the video data on user device 102 and store a reference (e.g., identifier, URL, etc.) for the stored video data in the data structure for the clip, as described above.

Figure 23:
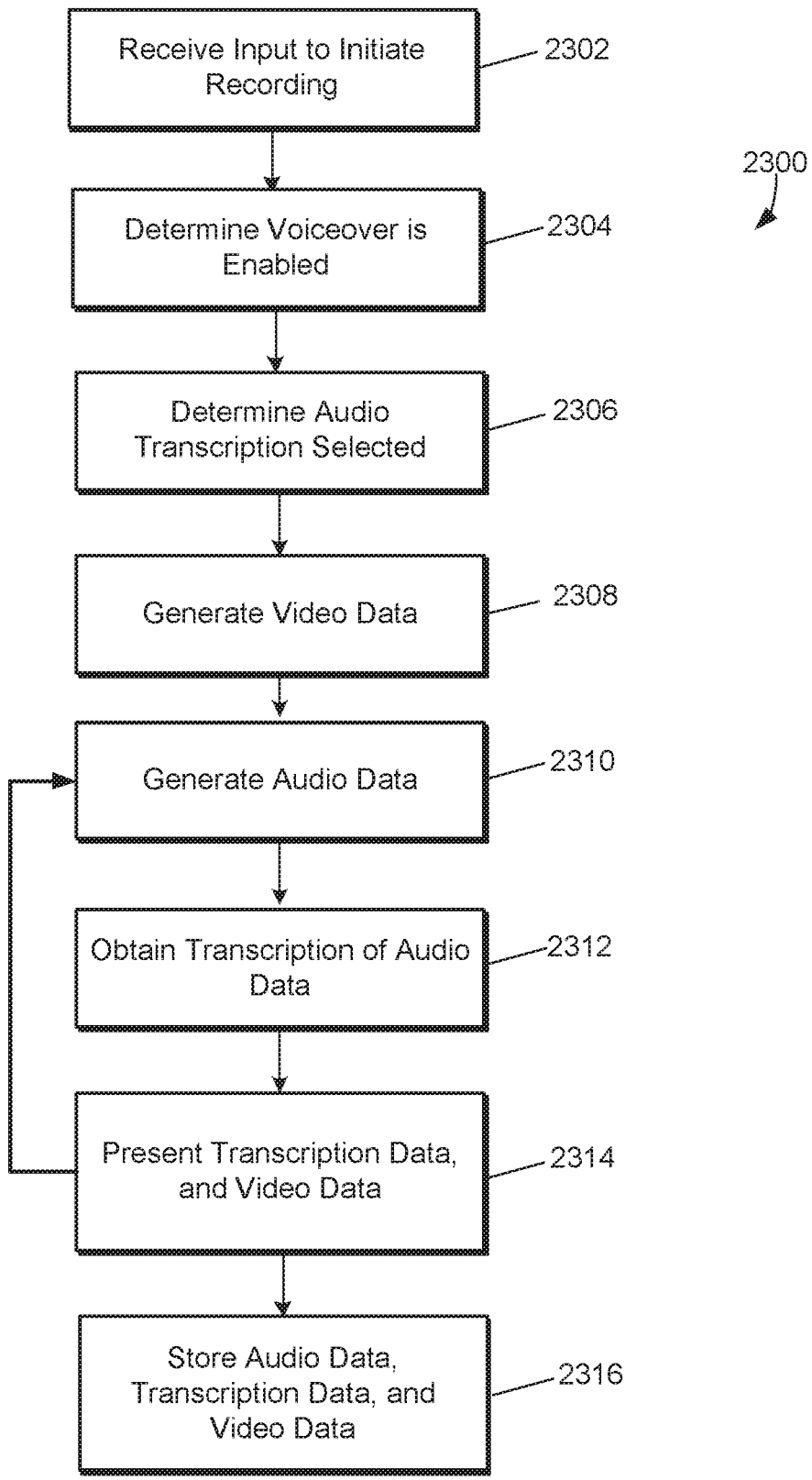
FIG. 23 is a flow diagram of an example process for generating a clip when a titling style is selected and voiceover is enabled.

FIG. 23 is a flow diagram of an example process 2300 for generating a clip when a titling style is selected and voiceover is enabled. For example, process 2300 can be performed by media messaging application 104 to generate a clip that conforms to the user selected transcription (e.g., titling style) and voiceover options.

At step 2302, a computing device can receive user input to initiate recording of data for a clip in a media message. For example, media messaging application 104 can receive user input selecting and holding the recording graphical element 514 described above.

At step 2304, the computing device can determine that voiceover is enabled for the clip. For example, media messaging application 104 can receive user input selecting graphical element 510. In response to receiving the user input to graphical element 510, media messaging application 104 can enable voiceovers for the clip. For example, enabling voiceovers for the clip will cause media message application 104 to persistently store audio data received from microphone 108 and playback the audio data when the clip is subsequently presented.

At step 2306, the computing device can determine that audio transcription was selected by the user for the clip. For example, media messaging application 104 can receive user input selecting a titling style for the clip. When a titling style is selected, media messaging application 104 can obtain transcriptions of audio data (e.g., the audio stream) captured for the clip, as described above.

At step 2308, the computing device can generate video data for the clip. For example, media messaging application 104 can capture video data for the clip using camera 106 on user device 102.

At step 2310, the computing device can generate audio data for the clip. For example, media messaging application 104 can capture audio data or receive an audio stream for the clip using microphone 108 on user device 102. Audio data can be captured and transcribed incrementally or iteratively. Thus, at step 2110, the generated audio data may correspond to only a portion (e.g., less than all, a fraction) of the total audio data captured for the clip when recording is terminated.

At step 2312, the computing device can obtain transcription data corresponding to the captured audio data. For example, media messaging application 104 can determine that a titling style was selected by the user (e.g., transcription is enabled) and send the audio data to dictation service 110. Dictation service 110 can generate transcription data based on speech detected in the audio data and return the transcription data to media messaging application 104.

At step 2114, the computing device can present the transcription data overlaid on top of the video data on a display of the computing device. For example, media messaging application 104 can present the transcription data (e.g., candidate words having the highest confidence score) while recording and presenting video data on the display of user device 102. The transcription data can be presented according to the attributes and/or definition of the titling style selected by the user, as described above. If the user continues to record audio and video data for the clip, process 2114 can loop back to step 2110. If the user has terminated recording audio and video data for the clip, the transcription data can be finalized and stored with the video data and audio data in the clip (or in association with the clip) at step 2116.

Figure 24:
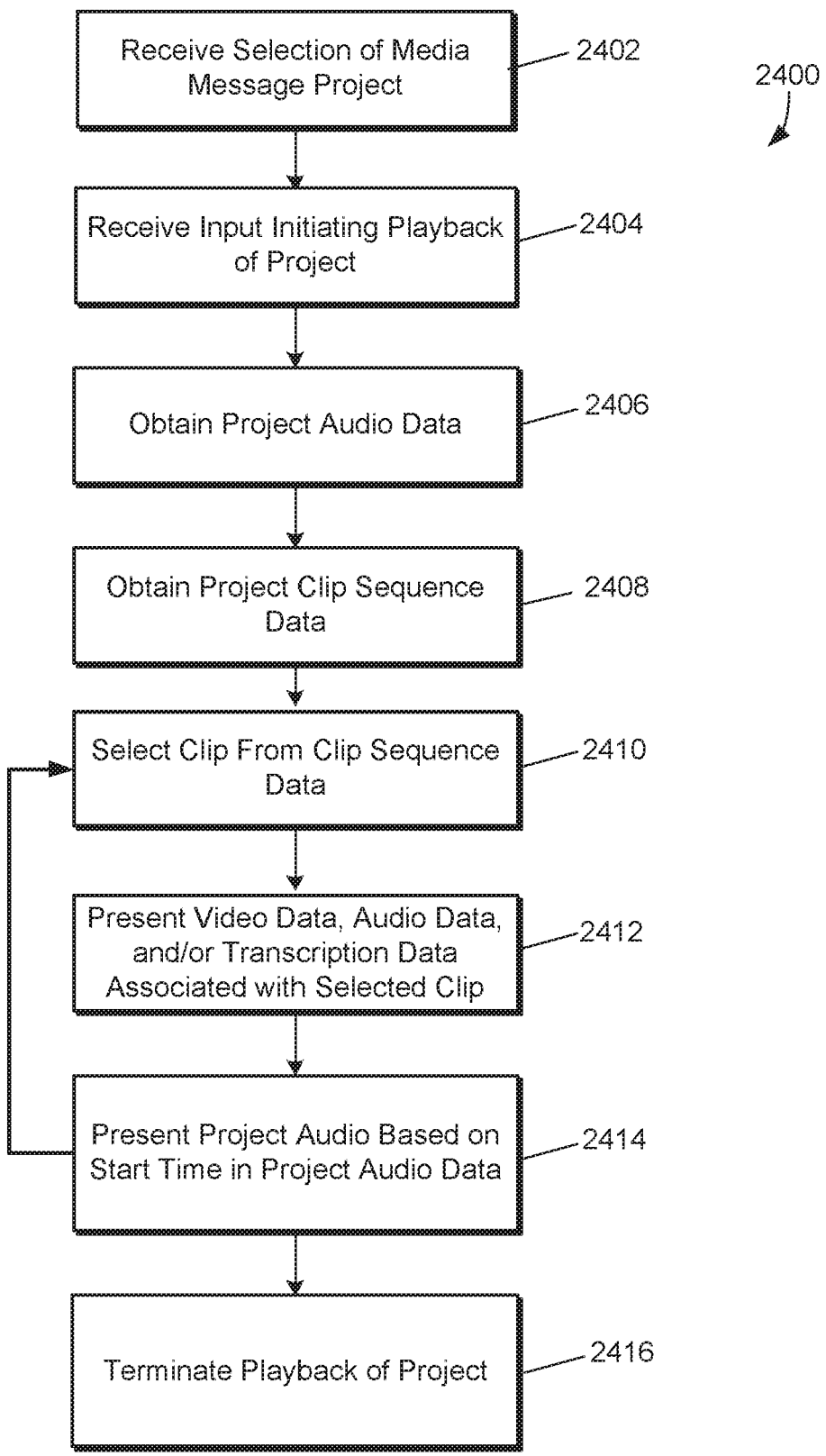
FIG. 24 is flow diagram of an example process for presenting a media message.

FIG. 24 is flow diagram of an example process 2400 for presenting a media message. For example, process 2400 can be performed by media messaging application 104 in when the user selects to playback a media message project.

At step 2402, a computing device can receive a selection of a media message project. For example, the user can interact with media messaging application 104 to select a previously recorded media message project. The user can select to playback a media message project currently open in media messaging application 104.

At step 2404, the computing device can receive input initiating playback of a media message project. For example, the user can select a play button presented by media messaging application 104 to cause media messaging application to initiate playback of the media message project.

At step 2406, the computing device can obtain project audio data. For example, the project audio data can correspond to the soundtrack selected for the media message project by the user. The project audio data can identify the soundtrack (e.g., audio file, music track, etc.) selected by the user. The project audio data can specify a start time for beginning playback of the soundtrack.

At step 2408, the computing device can obtain project clip sequence data. As described above, the project clip sequence data can include an ordered collection of clips associated with the media message project. The order of the clips in the clip sequence data dictates or defines the order in which the clips are presented when the media message is played back or presented by the media messaging application 104.

At step 2410, the computing device can select a clip from the clip sequence data associated with the media message project. For example, media messaging application 104 can select the first unplayed clip in the sequence of clips.

At step 2412, the computing device can present video data, audio data, and/or transcription data associated with the selected clip. For example, media messaging application 104 can present the video data (e.g., still image, movie, etc.) identified in the clip data structure for the selected clip using the image filter selected for the selected clip. If voiceovers are enabled for the selected clip, media messaging application 104 can present the audio data identified in the clip data structure for the selected clip. If a titling style has been selected for the selected clip, media messaging application 104 can present the transcription data identified in the clip data structure according to the attributes of the selected titling style. The audio data can be synchronized with the video presentation based on the timing information (e.g., timing offsets) stored for the audio data. The transcription data can be synchronized with the video presentation based on the timing information (e.g., timing offsets) stored for the tokens in the transcription data, as described above.

At step 2414, the computing device can present project audio based on the start time in the project audio data. For example, media messaging application 104 can determine when the current playback elapsed time corresponds to the timing offset specified by the start time attribute of the soundtrack asset, as described above. When the current playback elapsed time for the media message corresponds to the timing offset specified by the start time attribute of the soundtrack asset, media messaging application 104 can begin playback of the project audio (e.g., soundtrack). Playback of the project audio can continue until playback of the media message is complete. If the clip sequence for the project includes additional unplayed clips, process 2400 can loop back to step 2410 and where media messaging application 104 can select the next unplayed clip from the clip sequence. If there are no more unplayed clips in the clip sequence, process 2400 can continue to step 2416 where playback of the media message is terminated.

Graphical User Interfaces

This disclosure above describes various Graphical User Interfaces (GUIs) for implementing various features, processes or workflows. These GUIs can be presented on a variety of electronic devices including but not limited to laptop computers, desktop computers, computer terminals, television systems, tablet computers, e-book readers and smart phones. One or more of these electronic devices can include a touch-sensitive surface. The touch-sensitive surface can process multiple simultaneous points of input, including processing data related to the pressure, degree or position of each point of input. Such processing can facilitate gestures with multiple fingers, including pinching and swiping.

When the disclosure refers to "select" or "selecting" user interface elements in a GUI, these terms are understood to include clicking or "hovering" with a mouse or other input device over a user interface element, or touching, tapping or gesturing with one or more fingers or stylus on a user interface element. User interface elements can be virtual buttons, menus, selectors, switches, sliders, scrubbers, knobs, thumbnails, links, icons, radio buttons, checkboxes and any other mechanism for receiving input from, or providing feedback to a user.

Privacy

The present disclosure recognizes that the use of such personal information data, in the present technology, can be used to the benefit of users. For example, the personal information data can be used to deliver targeted content that is of greater interest to the user. Accordingly, use of such personal information data enables calculated control of the delivered content. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services. In another example, users can select not to provide location information for targeted content delivery services. In yet another example, users can select to not provide precise location information, but permit the transfer of location zone information.

Example System Architecture

Figure 25:
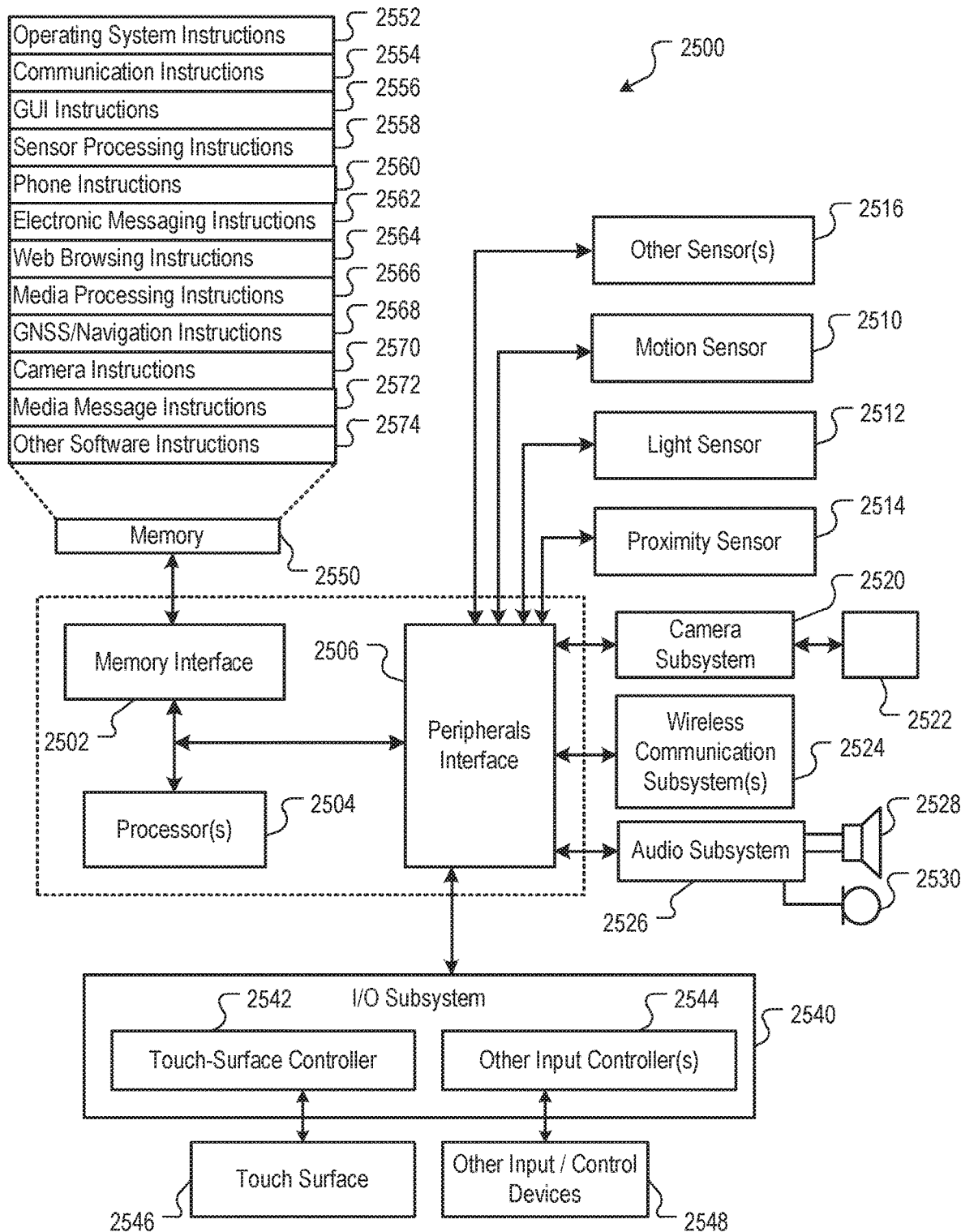
FIG. 25 is a block diagram of an example computing device that can implement the features and processes of FIGS. 1-24.

FIG. 25 is a block diagram of an example computing device 2500 that can implement the features and processes of FIGS. 1-24. The computing device 2500 can include a memory interface 2502, one or more data processors, image processors and/or central processing units 2504, and a peripherals interface 2506. The memory interface 2502, the one or more processors 2504 and/or the peripherals interface 2506 can be separate components or can be integrated in one or more integrated circuits. The various components in the computing device 2500 can be coupled by one or more communication buses or signal lines.

Sensors, devices, and subsystems can be coupled to the peripherals interface 2506 to facilitate multiple functionalities. For example, a motion sensor 2510, a light sensor 2512, and a proximity sensor 2514 can be coupled to the peripherals interface 2506 to facilitate orientation, lighting, and proximity functions. Other sensors 2516 can also be connected to the peripherals interface 2506, such as a global navigation satellite system (GNSS) (e.g., GPS receiver), a temperature sensor, a biometric sensor, magnetometer or other sensing device, to facilitate related functionalities.

A camera subsystem 2520 and an optical sensor 2522, e.g., a charged coupled device (CCD) or a complementary metal-oxide semiconductor (CMOS) optical sensor, can be utilized to facilitate camera functions, such as recording photographs and video clips. The camera subsystem 2520 and the optical sensor 2522 can be used to collect images of a user to be used during authentication of a user, e.g., by performing facial recognition analysis.

Communication functions can be facilitated through one or more wireless communication subsystems 2524, which can include radio frequency receivers and transmitters and/or optical (e.g., infrared) receivers and transmitters. The specific design and implementation of the communication subsystem 2524 can depend on the communication network(s) over which the computing device 2500 is intended to operate. For example, the computing device 2500 can include communication subsystems 2524 designed to operate over a GSM network, a GPRS network, an EDGE network, a Wi-Fi or WiMax network, and a Bluetooth™ network. In particular, the wireless communication subsystems 2524 can include hosting protocols such that the device 100 can be configured as a base station for other wireless devices.

An audio subsystem 2526 can be coupled to a speaker 2528 and a microphone 2530 to facilitate voice-enabled functions, such as speaker recognition, voice replication, digital recording, and telephony functions. The audio subsystem 2526 can be configured to facilitate processing voice commands, voice printing and voice authentication, for example.

The I/O subsystem 2540 can include a touch-surface controller 2542 and/or other input controller(s) 2544. The touch-surface controller 2542 can be coupled to a touch surface 2546. The touch surface 2546 and touch-surface controller 2542 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 2546.

The other input controller(s) 2544 can be coupled to other input/control devices 2548, such as one or more buttons, rocker switches, thumb-wheel, infrared port, USB port, and/or a pointer device such as a stylus. The one or more buttons (not shown) can include an up/down button for volume control of the speaker 2528 and/or the microphone 2530.

In one implementation, a pressing of the button for a first duration can disengage a lock of the touch surface 2546; and a pressing of the button for a second duration that is longer than the first duration can turn power to the computing device 2500 on or off. Pressing the button for a third duration can activate a voice control, or voice command, module that enables the user to speak commands into the microphone 2530 to cause the device to execute the spoken command. The user can customize a functionality of one or more of the buttons. The touch surface 2546 can, for example, also be used to implement virtual or soft buttons and/or a keyboard.

In some implementations, the computing device 2500 can present recorded audio and/or video files, such as MP3, AAC, and MPEG files. In some implementations, the computing device 2500 can include the functionality of an MP3 player, such as an iPod™. The computing device 2500 can, therefore, include a 36-pin connector that is compatible with the iPod. Other input/output and control devices can also be used.

The memory interface 2502 can be coupled to memory 2550. The memory 2550 can include high-speed random access memory and/or non-volatile memory, such as one or more magnetic disk storage devices, one or more optical storage devices, and/or flash memory (e.g., NAND, NOR). The memory 2550 can store an operating system 2552, such as Darwin, RTXC. LINUX, UNIX, OS X, WINDOWS, or an embedded operating system such as VxWorks.

The operating system 2552 can include instructions for handling basic system services and for performing hardware dependent tasks. In some implementations, the operating system 2552 can be a kernel (e.g., UNIX kernel). In some implementations, the operating system 2552 can include instructions for performing voice authentication. For example, operating system 2552 can implement the media message creation and presentation features as described with reference to FIGS. 1-24.

The memory 2550 can also store communication instructions 2554 to facilitate communicating with one or more additional devices, one or more computers and/or one or more servers. The memory 2550 can include graphical user interface instructions 2556 to facilitate graphic user interface processing; sensor processing instructions 2558 to facilitate sensor-related processing and functions; phone instructions 2560 to facilitate phone-related processes and functions; electronic messaging instructions 2562 to facilitate electronic-messaging related processes and functions; web browsing instructions 2564 to facilitate web browsing-related processes and functions; media processing instructions 2566 to facilitate media processing-related processes and functions; GNSS/Navigation instructions 2568 to facilitate GNSS and navigation-related processes and instructions; and/or camera instructions 2570 to facilitate camera-related processes and functions.

The memory 2550 can store other software instructions 2572 to facilitate other processes and functions, such as the media message creation and presentation processes and functions as described with reference to FIGS. 1-24.

The memory 2550 can also store other software instructions 2574, such as web video instructions to facilitate web video-related processes and functions; and/or web shopping instructions to facilitate web shopping-related processes and functions. In some implementations, the media processing instructions 2566 are divided into audio processing instructions and video processing instructions to facilitate audio processing-related processes and functions and video processing-related processes and functions, respectively.

Each of the above identified instructions and applications can correspond to a set of instructions for performing one or more functions described above. These instructions need not be implemented as separate software programs, procedures, or modules. The memory 2550 can include additional instructions or fewer instructions. Furthermore, various functions of the computing device 2500 can be implemented in hardware and/or in software, including in one or more signal processing and/or application specific integrated circuits.

What is claimed is:

1. A method comprising:
receiving a user input initiating playback of a media message, the media message including a sequence of clips that include video data and transcription data;
in response to the user input, obtaining, from the media message, a first video data and a first transcription data associated with a first clip in the sequence of clips, wherein the first transcription data includes a plurality of first tokens associated with a sequence of words, each first token associated with a different word of the sequence of words and having respective timing data that indicates when, during a recording of the sequence of words in the first video data, a spoken word corresponding to the first token was obtained; and
presenting, on a display, the first video data and the first transcription data from the media message according to timing data for each respective first token in the first transcription data such that a rate of presentation of the first transcription data imitates a cadence of corresponding spoken words when they were captured during recording of the first video data,
wherein the method is performed by a computing device comprising one or more processors.

2. The method of claim 1, wherein the first video data is obtained from a video stream captured by a camera, the video stream including the video data captured by the camera to generate the media message.

3. The method of claim 1, wherein the transcription data is derived from an audio stream that includes speech captured by a microphone.

4. The method of claim 3, further comprising:
persistently storing the audio stream in association with the media message in response to voiceovers being enabled; and
deleting the audio stream after the transcription data is derived therefrom in response to voiceovers being disabled.

5. The method of claim 1, wherein the first transcription data is presented to the display according to a titling style designated for the first clip.

6. The method of claim 1, wherein the timing data for each respective token includes a time offset and a duration, and further comprising:
presenting a particular token in the first clip according to the time offset and the duration associated with the particular token.

7. The method of claim 6, further comprising:
presenting first text of the first transcription data corresponding to the particular token for a period of time corresponding to the duration associated with the particular token.

8. A computing device comprising:
one or more processors; and
a non-transitory computer-readable medium including instructions that, when executed by the one or more processors, cause the one or more processors to perform operations comprising:
receiving a user input initiating playback of a media message, the media message including a sequence of clips that include video data and transcription data;
in response to the user input, obtaining, from the media message, a first video data and a first transcription data associated with a first clip in the sequence of clips, wherein the first transcription data includes a plurality of first tokens associated with a sequence of words, each first token associated with a different word of the sequence of words and having respective timing data that indicates when, during a recording of the sequence of words in the first video data, a spoken word corresponding to the first token was obtained; and
presenting, on a display, the first video data and the first transcription data from the media message according to timing data for each respective first token in the first transcription data such that a rate of presentation of the first transcription data imitates a cadence of corresponding spoken words when they were captured during recording of the first video data.

9. The computing device of claim 8, wherein the first video data is obtained from a video stream captured by a camera, the video stream including the video data captured by the camera to generate the media message.

10. The computing device of claim 8, wherein the transcription data is derived from an audio stream that includes speech captured by a microphone.

11. The computing device of claim 10, wherein the operations further comprise:
persistently storing the audio stream in association with the media message in response to voiceovers being enabled; and
deleting the audio stream after the transcription data is derived therefrom in response to voiceovers being disabled.

12. The computing device of claim 8, wherein the first transcription data is presented to the display according to a titling style designated for the first clip.

13. The computing device of claim 8, wherein the timing data for each respective token includes a time offset and a duration, and wherein the operations further comprise:
presenting a particular token in the first clip according to the time offset and the duration associated with the particular token.

14. The computing device of claim 13, wherein the operations further comprise:
presenting first text of the first transcription data corresponding to the particular token for a period of time corresponding to the duration associated with the particular token.

15. A non-transitory computer-readable medium comprising instructions that, when executed by one or more processors, cause the one or more processors to perform operations comprising:
receiving a user input initiating playback of a media message, the media message including a sequence of clips that include video data and transcription data;
in response to the user input, obtaining, from the media message, a first video data and a first transcription data associated with a first clip in the sequence of clips, wherein the first transcription data includes a plurality of first tokens associated with a sequence of words, each first token associated with a different word of the sequence of words and having respective timing data that indicates when, during a recording of the sequence of words in the first video data, a spoken word corresponding to the first token was obtained; and
presenting, on a display, the first video data and the first transcription data from the media message according to timing data for each respective first token in the first transcription data such that a rate of presentation of the first transcription data imitates a cadence of corresponding spoken words when they were captured during recording of the first video data.

16. The non-transitory computer-readable medium of claim 15, wherein the first video data is obtained from a video stream captured by a camera, the video stream including the video data captured by the camera to generate the media message, and wherein the transcription data is derived from an audio stream that includes speech captured by a microphone.

17. The non-transitory computer-readable medium of claim 16, wherein the operations further comprise:
persistently storing the audio stream in association with the media message in response to voiceovers being enabled; and
deleting the audio stream after the transcription data is derived therefrom in response to voiceovers being disabled.

18. The non-transitory computer-readable medium of claim 15, wherein the first transcription data is presented to the display according to a titling style designated for the first clip.

19. The non-transitory computer-readable medium of claim 15, wherein the timing data for each respective token includes a time offset and a duration, and wherein the operations further comprise:
presenting a particular token in the first clip according to the time offset and the duration associated with the particular token.

20. The non-transitory computer-readable medium of claim 19, wherein the operations further comprise:
presenting first text of the first transcription data corresponding to the particular token for a period of time corresponding to the duration associated with the particular token.

* * * * *